United States Patent
Nakahori

(10) Patent No.: US 8,072,305 B2
(45) Date of Patent: Dec. 6, 2011

(54) DC/DC CONVERTER

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 394 days.

(21) Appl. No.: 12/047,770

(22) Filed: Mar. 13, 2008

(65) Prior Publication Data

US 2008/0239759 A1    Oct. 2, 2008

(30) Foreign Application Priority Data

Mar. 30, 2007    (JP) .............................. P2007-094787

(51) Int. Cl.
| | |
|---|---|
| H01F 5/00 | (2006.01) |
| H01F 27/28 | (2006.01) |
| H01F 17/04 | (2006.01) |
| H01J 1/00 | (2006.01) |
| H02M 3/22 | (2006.01) |
| H02M 5/40 | (2006.01) |
| H02M 5/16 | (2006.01) |

(52) U.S. Cl. ........ 336/200; 336/220; 336/221; 336/222; 336/232; 363/15; 363/20; 363/34; 363/171

(58) Field of Classification Search .................. 336/200, 336/220–223, 232; 363/15, 20, 34, 171
See application file for complete search history.

(56) References Cited

U.S. PATENT DOCUMENTS

| | | | |
|---|---|---|---|
| 4,613,843 A * | 9/1986 | Esper et al. | |
| 6,661,325 B2 * | 12/2003 | Suh et al. | |
| 2002/0163818 A1 * | 11/2002 | Green et al. | 363/20 |
| 2005/0110606 A1 * | 5/2005 | Vinciarelli | 336/200 |

FOREIGN PATENT DOCUMENTS

| | | | |
|---|---|---|---|
| JP | A-06-215951 | * | 8/1994 |
| JP | A-07-142269 | * | 6/1995 |
| JP | B2-2629999 | * | 4/1997 |
| JP | A-10-041141 | * | 2/1998 |
| JP | A-10-135041 | * | 5/1998 |
| JP | B2-3057203 | * | 4/2000 |
| JP | A-2002-237423 | * | 8/2002 |
| JP | A-2004-335780 | * | 11/2004 |
| JP | A-2005-033938 | * | 2/2005 |
| JP | A-2005-203744 | * | 7/2005 |
| JP | A-2006-013094 | * | 1/2006 |
| JP | A-2006-149127 | * | 6/2006 |

* cited by examiner

*Primary Examiner* — Elvin G Enad
*Assistant Examiner* — Ronald Hinson
(74) *Attorney, Agent, or Firm* — Oliff & Berridge, PLC

(57) ABSTRACT

Primary and secondary coils are provided in the first through section and a coil group is also provided in the second through section. Hence, the surface area over which the coil group extends within a plane which is perpendicular to the through sections is greater than in the case where all of the coils are provided in a single through section. The surface area which is not covered by the magnetic body cores of the platelike members increases. In cases where the surface area of the members is large, the heat radiation characteristic is enhanced. Hence, the cooling efficiency of the transformer improves. In cases where there is a plurality of coil groups which are magnetically coupled to one another in particular, because it is difficult to move the heat produced in the plurality of coil groups through heat conduction, heat transfer, or heat radiation, a heat radiation structure of this kind is effective.

5 Claims, 33 Drawing Sheets

DC/DC CONVERTER

BACKGROUND OF THE INVENTION

1. Field of the Invention

The present invention relates to a switching supply such as a DC/DC converter.

2. Related Background Art

A conventional switching supply such as a DC/DC converter appears in Japanese Patent No. 2,629,999, for example. This DC/DC converter uses a transformer and generally has a primary coil and a secondary coil wound around one core.

SUMMARY OF THE INVENTION

However, when the transformer is heated as a result of the driving of the DC/DC converter, the conductor resistance increases and loss increases and there is a vicious circle in that this loss is also converted into heat, which in turn leads to a loss increase. As a result, there is the problem that the efficiency of the converter drops. The present invention was conceived in view of this problem and an object of the present invention is to provide a switching supply such as a DC/DC converter which exhibits superior power conversion efficiency.

In order to solve the above problem, the switching supply according to the present invention involves a switching supply which comprises an inverter circuit which is connected to a primary coil group of the transformer and a rectification/smoothing circuit which is connected to a secondary coil group of the transformer.

The transformer comprises a core that comprises a first through section and a second through section which is spatially separate from the first through section and constitutes a magnetic circuit together with the first through section; the first through section passes through the inside of at least one coil of the primary coil group and at least one coil of the secondary coil group; the second through section passes through the inside of the remaining coils of the primary and secondary coil groups; the coil group that follows one loop direction of the magnetic circuit comprises a first coil group which has a primary coil and a secondary coil that are magnetically coupled and, subsequently to the first coil group, a second coil group which has a primary coil and a secondary coil that are magnetically coupled.

According to this switching supply, the first through section comprises primary and secondary coils which pass therethrough and a coil group is also provided in the second through section. Hence, the surface area over which the coil group extends within a plane which is perpendicular to the through sections is greater than in the case where all of the coils are provided in a single through section. Therefore, because the heat radiation characteristic is improved in the case of a wide surface area, the cooling efficiency of the transformer improves. In cases where the switching supply comprises a plurality of coil groups which are magnetically coupled to one another in particular, because it is difficult to move the heat produced in the plurality of coil groups through heat conduction, heat transfer, or heat radiation, a heat radiation structure of this kind is effective.

Furthermore, in order to increase the current that is handled by the transformer, the use of a multiplicity of coils is preferable. However, in maintaining the symmetry and stability of the respective coil groups, the coils of the first or second coil group are preferably arranged in the one loop direction of the magnetic circuit in the following order: secondary coil, primary coil, and secondary coil, or primary coil, secondary coil, and primary coil. In this case, because the symmetry of the coil arrangement is maintained for the center coils, the current distribution of the coil groups is made uniform.

Furthermore, in cases where, as a condition of heat being produced, a large current flows with a high AC resistance in the plurality of coil groups, the partial AC resistance is preferably increased with the object of suppressing the output ringing of the switching supply.

In other words, with a switching supply of this kind, the primary coil of the first coil group and the primary coil of the second coil group are connected in series and the AC resistance of the primary coil of the first coil group and the AC resistance of the primary coil of the second coil group are preferably set such that one is alternately higher than the other in sync with the switching of the inverter circuit.

Generally, because a current in a reverse direction from that of the primary coil is induced in the secondary coil, in cases where the primary and secondary coils are adjacent to one another, the influence of the skin effect and proximity effect are reduced and the AC resistance is reduced. However if the output current of the secondary coil adjacent to the primary coil is obstructed by using a reverse withstand voltage of a diode, the AC resistance of the primary coil can be increased. When a primary coil with a high AC resistance is connected in series with a primary coil with a low AC resistance, because AC resistance converges the oscillation within the coil group, ringing can be suppressed. Therefore, the power conversion efficiency of the switching supply rises further.

The switching supply such as a DC/DC converter of the present invention has improved cooling efficiency and the power conversion efficiency is superior.

DESCRIPTION OF THE PREFERRED EMBODIMENTS

Figure 1:
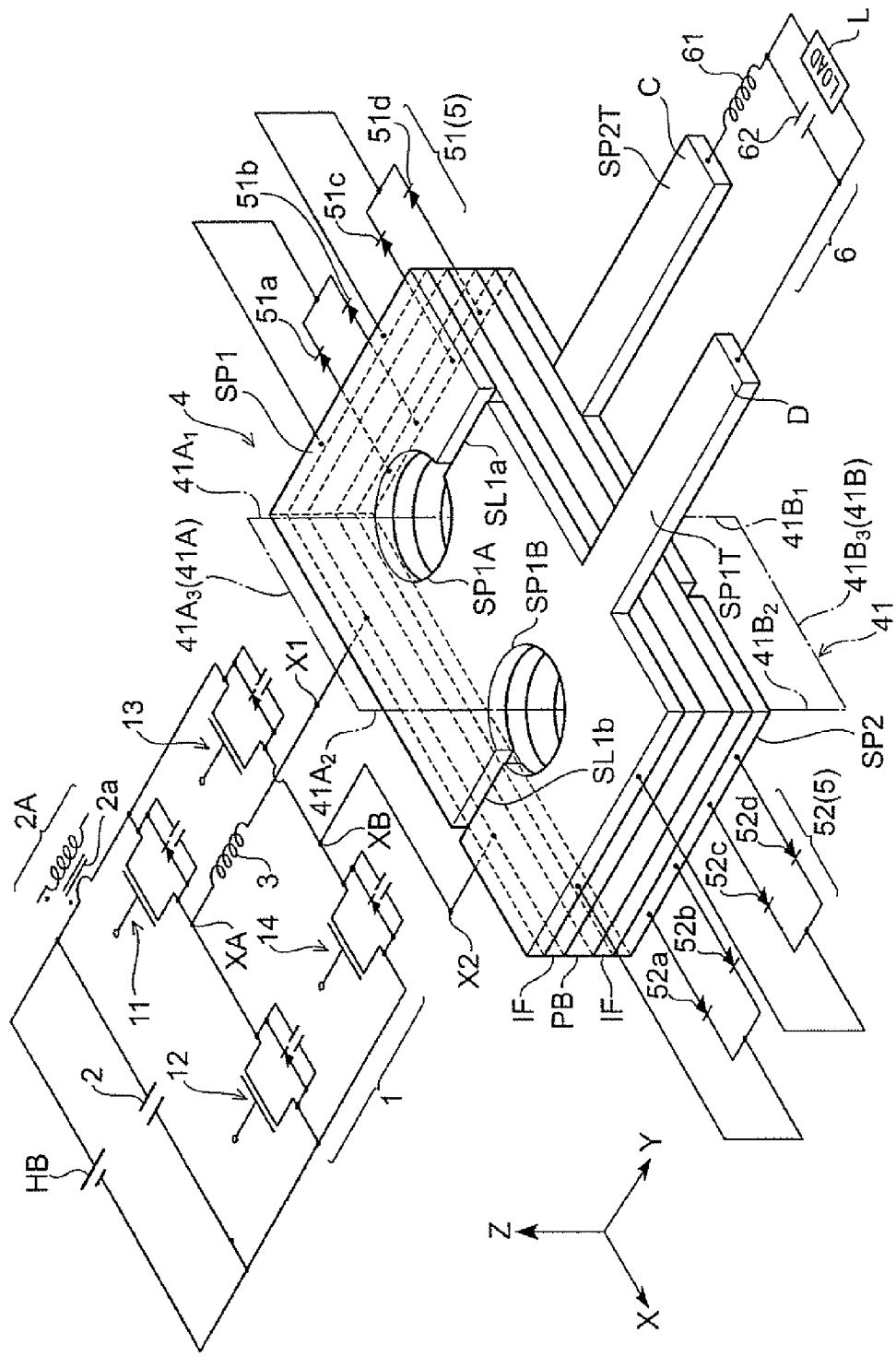
FIG. 1 is a perspective view of the DC/DC converter.

The DC/DC converter of an embodiment will be described hereinbelow. The same reference numerals are assigned to the same elements and repetitive descriptions are omitted.

FIG. 1 is a perspective view of the DC/DC converter.

The DC/DC converter comprises an inverter circuit 1 which is connected to a primary coil group of a transformer 4, and a rectification circuit 5 and smoothing circuit 6 which are connected to a secondary coil group of the transformer 4. The rectification circuit 5 and smoothing circuit 6 taken as a whole constitute a rectification/smoothing circuit. An input smoothing capacitor 2 and a current detection current transformer 2A are provided next to the power source HB of the inverter circuit 1.

The inverter circuit 1 has a plurality of switching elements 11, 12, 13, and 14 disposed between the high-voltage power line and low-voltage power line of power source HB. The switching elements 11 and 12 which constitute a first switching element array are connected in series and the switching elements 13 and 14 which constitute a second switching element array are also in series. The first switching element array and second switching element array are arranged in parallel between the power lines.

The switching elements 11, 12, 13, and 14 comprise a field effect transistor and a parasitic diode and a capacitor are attached between the source and drain of each field effect transistor so that the power source voltage is applied with a reverse bias. The connection point XA between the switching element 11 and switching element 12 is connected to the first input terminal X1 of the transformer 4 via a resonant inductor 3. The connection point XB between the switching element 13 and switching element 14 is connected to the other input terminal X2 of the transformer 4.

When an AC current is supplied across input terminals X1 and X2, an AC voltage which is induced in the secondary coil of the transformer 4 appears across terminals C and D which are also the output terminals of the transformer. The output voltage of the transformer 4 is converted into a DC voltage by the rectification/smoothing circuit and the converted DC voltage is supplied to a load L. The secondary coil is constituted by platelike members SP1 and SP2 which are formed by sheet metal. The number of terminals in the transformer 4 with this structure is only four, meaning that miniaturization and a reduction in the number of parts are achieved.

The upper platelike member SP1 comprises two openings SP1A and SP1B and comprises slits SL1a and SL1b which extend from the side walls of openings SP1A and SP1B to the outside edge of the platelike member SP1. The directions from the slits SL1a and SL1b to the openings SP1A and SP1B are mutually opposite.

Wiring substrate PB on whose upper and lower sides the helical primary coil is printed is interposed via an insulating layer IF between the platelike members SP1 and SP2.

The platelike member SP1 and platelike member SP2 are electrically connected via diodes 51 and 52 which constitute the rectification circuit 5. The direction of the wire portion linking the centers of the openings SPA1 and SPA2 is the X axis direction.

The anode of diode 51 is connected to an edge which intersects one direction of the X axis of lower platelike member SP2 and the cathode is connected to an edge which intersects one direction of the X axis of upper platelike member SP1. The anode of diode 52 is connected to an edge which intersects the other direction of the X axis of the lower platelike member SP2 and the cathode is connected to the edge which intersects the other direction of the X axis of the upper platelike member SP1.

In order to obtain a large output current, the diode 51 connects a plurality of diodes 51a, 51b, 51c, and 51d in parallel and diode 52 connects a plurality of diodes 52a, 52b, 52c, and 52d in parallel.

On the surface of the upper platelike member SP1, a current I/O section SP1T extends from the side which intersects the axis (Y axis assumed) which is orthogonal to the X axis of the platelike member so as to protrude in the Y axis direction from the main body section and, on the surface of the lower platelike member SP2, a current I/O section SP2T extends from the side which intersects the Y axis so as to protrude in the Y axis direction from the main body section. In addition, opening SP1B is located on the extension line in the Y axis negative direction of the current I/O section SP1T and opening SP2B (See FIG. 2) is located on the extension line in the Y axis negative direction of the current I/O section SP2T.

A through-hole in the openings SP1A and SP1B of transformer 4 passes through as far as the lower side of the transformer 4 and the core 41 passes through the inside of both through-holes. Core 41 forms a loop in plane XZ and constitutes a magnetic circuit. The member in the Z axis positive direction of core 41 comprises a leg portion $41A_1$ which passes through the inside of the first through-hole, a leg portion $41A_2$ which passes through the inside of the other through-hole, and a connection $41A_3$ which connects leg portion $41A_1$ and leg portion $41A_2$, and forms an inverted U-shaped magnetic body core 41A. The member in the Z axis negative direction of core 41 comprises a leg portion $41B_1$ which passes through the inside of the first through-hole, a leg portion $41B_2$ which passes through the inside of the other rough-hole, and a connection $41B_3$ which connects leg portion $41B_1$ and leg portion $41B_2$, and forms a U-shaped magnetic body core 41B. The leading edges of the leg portions of both of the magnetic body cores 41A and 41B face one another and make contact with one another. The leg portions $41A_1$ and $41B_1$ of the magnetic body cores which pass through the insides of the through-holes constitute a first through section 41X(See FIG. 3) and the leg portions 41A$_2$ and 41B$_2$ constitute a second through section 41Y (See FIG. 3). The first through section 41X and second through section 41Y are spatially separate along the X axis.

Figure 2:
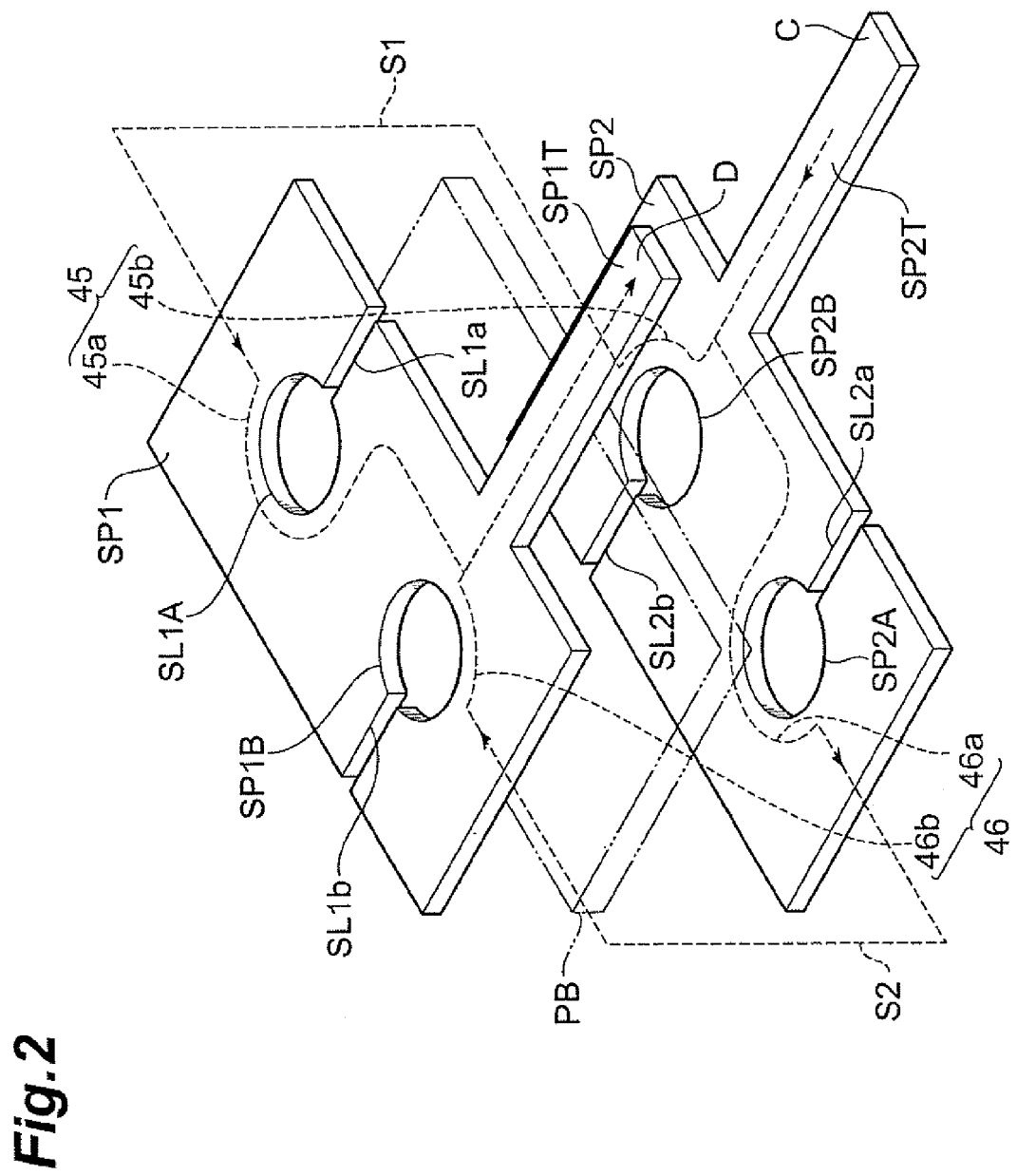
FIG. 2 is a perspective view of platelike members.

FIG. 2 is a perspective view of the platelike members.

The lower platelike member SP2 has a shape which is obtained by inverting the top and bottom of the upper platelike member SP1 and comprises two openings SP2A and SP2B. Furthermore, the lower platelike member SP2 comprises slits SL2a and SL2b which extend from the side wall of the openings SP2A and SP2B to the outside edge of the platelike member SP2. The directions from the slits SL2a and SL2b to the openings SP2A and SP2B are mutually opposite.

When the current which flows into the platelike member SP2 which constitutes the secondary coil from the lower current I/O section SP2T reaches the main body section, the current branches off to follow either one of the current path S1 and the current path S2. Which branch path the current follows depends on the direction of the current entering the primary coil.

The current path S1 comprises a path along the partial arc of the opening SP2B of the platelike member SP2 which prescribes a part 45b of the secondary coil 45 and a path which extends along the partial arc of the opening SP1A of the platelike member SP1 which prescribes the remaining part 45a of the secondary coil 45 and the current that passes through part 45a flows out to the downstream circuit via the upper current I/O section SP1T. Thus, the secondary coil 45 is constituted split into upper and lower platelike members. The current path S1 avoids slits SL2b and SL1a which extend in mutually opposite directions from the upper and lower platelike members SP2 and SP1 and describes an arc which flows only in a rotary direction.

The current path S2 comprises a path along a partial arc of opening SP2A of platelike member SP2 which prescribes a part 46a of the secondary coil 46 and a path along a partial arc of opening SP1B of platelike member SP1 which prescribes the remaining part 46b of the secondary coil 46 and the current that passes through part 46b flows out to the downstream circuit via the upper current I/O section SP1T. Thus, the secondary coil 46 is also constituted split into upper and lower platelike members. The current path S2 avoids slits SL2a and SL1b which extend in mutually opposite directions from the upper and lower platelike members SP2 and SP1 and describes an arc which flows only in a rotary direction.

Thus, in a DC/DC converter which comprises a transformer which has a primary coil and a secondary coil, the secondary coil comprises a pair of conductive platelike members (or conductive thin films) which are provided so as to sandwich the primary coil and slits which extend from the opening are formed in the respective platelike members, the respective platelike members are electrically connected, a secondary coil is formed by the current path such that the current which flows between the platelike members avoids the slits and which passes through the periphery of the opening. This structure is a simple structure. Furthermore, diodes 51 and 52 are interposed between the platelike members SP1 and SP2 which constitute half coils.

The rotational direction of the current can be freely set if the positions of each slit are changed.

Furthermore, the wiring substrate PB provided with the primary coil is located between the platelike member SP1 and the platelike member SP2.

Figure 3:
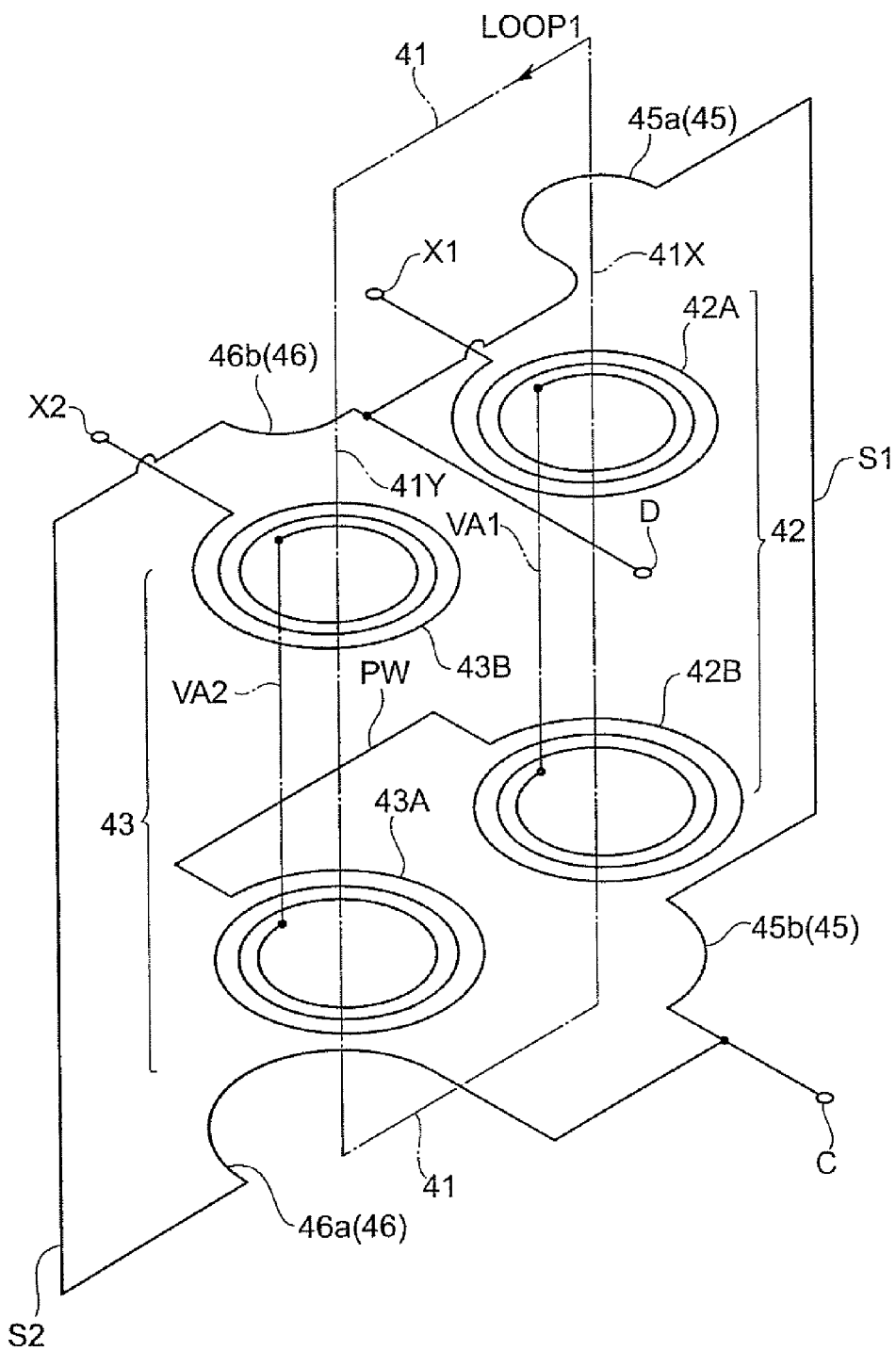
FIG. 3 is a connection diagram which shows, in perspective form, the connected relationship between primary coils 42 and 43 and secondary coils 45 and 46 which are provided on the wiring substrate.

FIG. 3 is a connection diagram which shows, in perspective form, the connected relationship between primary coils 42 and 43 and secondary coils 45 and 46 which are provided on the wiring substrate. The first through section 41X of the core 41 passes through the secondary coil 45a, primary coil 42A, primary coil 42B, and secondary coil 45b which are arranged in order starting from the top. The second through section 41Y of the core 41 passes through the secondary coil 46b, the primary coil 43B, the primary coil 43A, and the secondary coil 46a which are arranged in order starting from the top. These respective coils are planar coils. When the direction in which the coil is wound from the outside to the inside as viewed from the top of FIG. 3 is taken as the winding direction, the primary coil 42A is a left winding, the primary coil 42B is a right winding, the primary coil 43A is a right winding, and the primary coil 43B is a left winding.

The innermost end of the primary coil 42A and the innermost end of the primary coil 42B are electrically connected via a via-contact VA1 and, in cases where current is flowing in the coils from one direction, the directions of the currents flowing in both coils are then equal. The outermost end of the primary coil 42B is electrically connected to the outermost end of the adjacent primary coil 43B via the printed wiring PW. The innermost end of the primary coil 43B is electrically connected to the innermost end of the primary coil 43B via a via-contact VA2 and, in cases where current flows from one direction in these coils, the directions of the currents flowing in both coils are then equal. When current which flows in from terminal X1 is flowing, the magnetic flux created by the current flowing in coil 42 flows in a direction along loop LOOP1 of the magnetic circuit of core 41 and the magnetic flux created by the current flowing through the coil 43 also flows in a direction along loop LOOP1. When current which flows in from terminal X2 is flowing, a magnetic flux which is the reverse of loop LOOP1 is produced by the respective coils 42 and 43.

The center coils 42A and 42B can also be regarded as one coil 42 and the center coils 43A and 43B can also be regarded as one coil 43.

Figure 4:
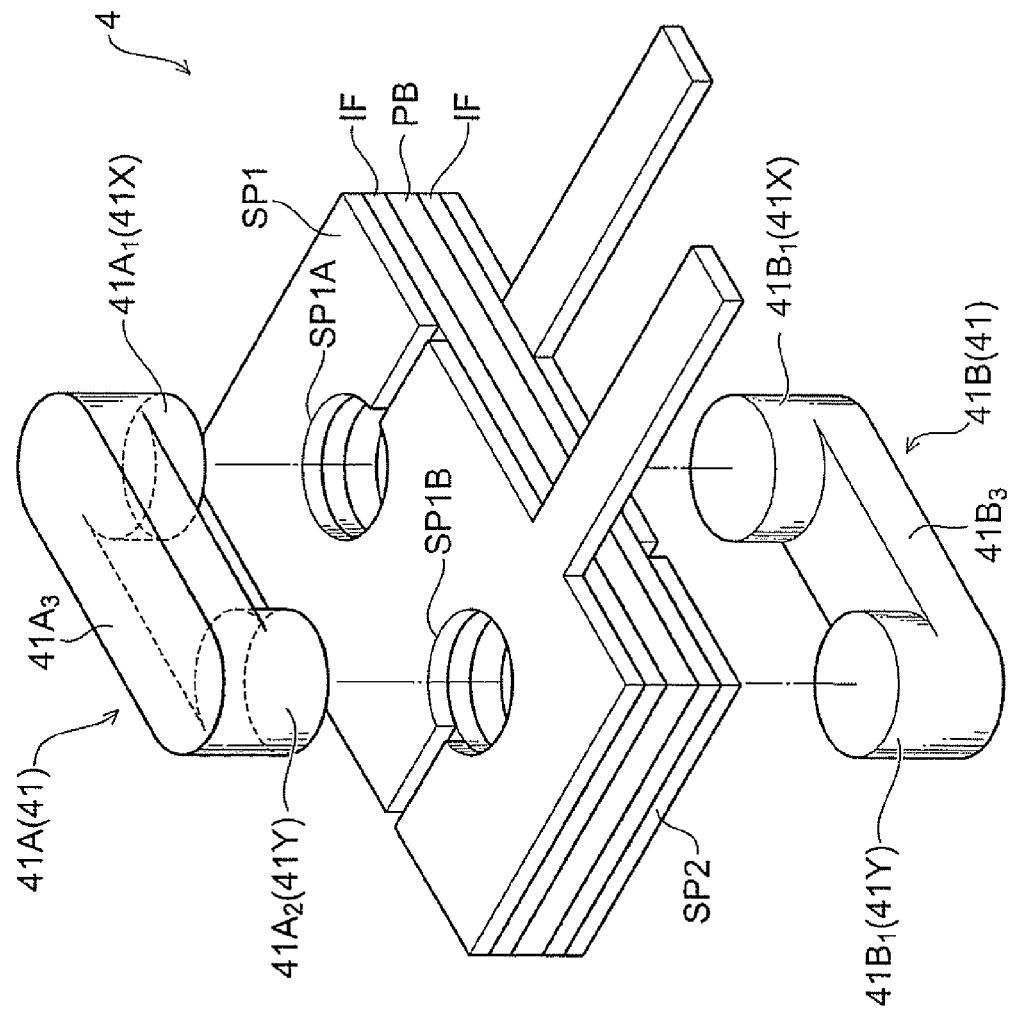
FIG. 4 is a perspective view of the transformer 4.

FIG. 4 is a perspective view of transformer 4.

Core 41 is constituted by an inverted U-shaped magnetic body 41A and a U-shaped magnetic body core 41B and the respective leg portions 41A$_1$, 41A$_2$, 41B$_1$ and 41B$_2$ constitute cylinders and are located in through-holes directly below openings SP1A and SP1B. The connection sections 41A$_3$ and 41B$_3$ are opposite the respective platelike members SP1 and SP2 and, in cases where the magnetic body cores 41A and 41B are combined, cover the area between the opening of the respective platelike members SP1 and SP2. A wide surface area which is not covered by the magnetic body cores 41A and 41B exists in the platelike members SP1 and SP2 of the transformer 4.

That is, the transformer 4 comprises a core 41 which comprises the first through section 41X and a second through section 41Y which constitutes a magnetic circuit together with the first through section 41X and at least one coil (42A, for example) of the primary coil group and at least one coil (45a (45), for example) of the secondary coil group are wound around the first through section 41X while the remaining coils of the primary and secondary coils are wound around the second through section 41Y. The coil group that follows the one loop direction (LOOP1: See FIG. 3, for example) of the magnetic circuit comprises a first coil group (45b, 42B, 42A, 45a: See FIG. 3) which comprises magnetically coupled primary and secondary coils and, subsequently to the first coil group, a second coil group (46a, 43B, 43A, 46a: See FIG. 3) which comprises magnetically coupled primary and secondary coils. The first through section 41X and second through section 41Y pass through the insides of the coils wound therearound.

According to this DC/DC converter, because primary and secondary coils are provided in the first through section 41X and a coil group is also provided in the second through section 41Y, the surface area over which the coil group extends within a plane which is perpendicular to the through sections 41X and 41Y is greater than in the case where all of the coils are provided in a single through section. The surface area which is not covered by the magnetic body cores 41A and 41B of the platelike members SP1 and SP2 increases. In cases where the surface area of the members is large, the heat radiation characteristic is enhanced. Hence, the cooling efficiency of the transformer 4 improves. In cases where there is a plurality of coil groups which are magnetically coupled to one another in particular, because the heat produced in the plurality of coil groups is easily confined, such a heat radiation structure is effective.

Figure 5:
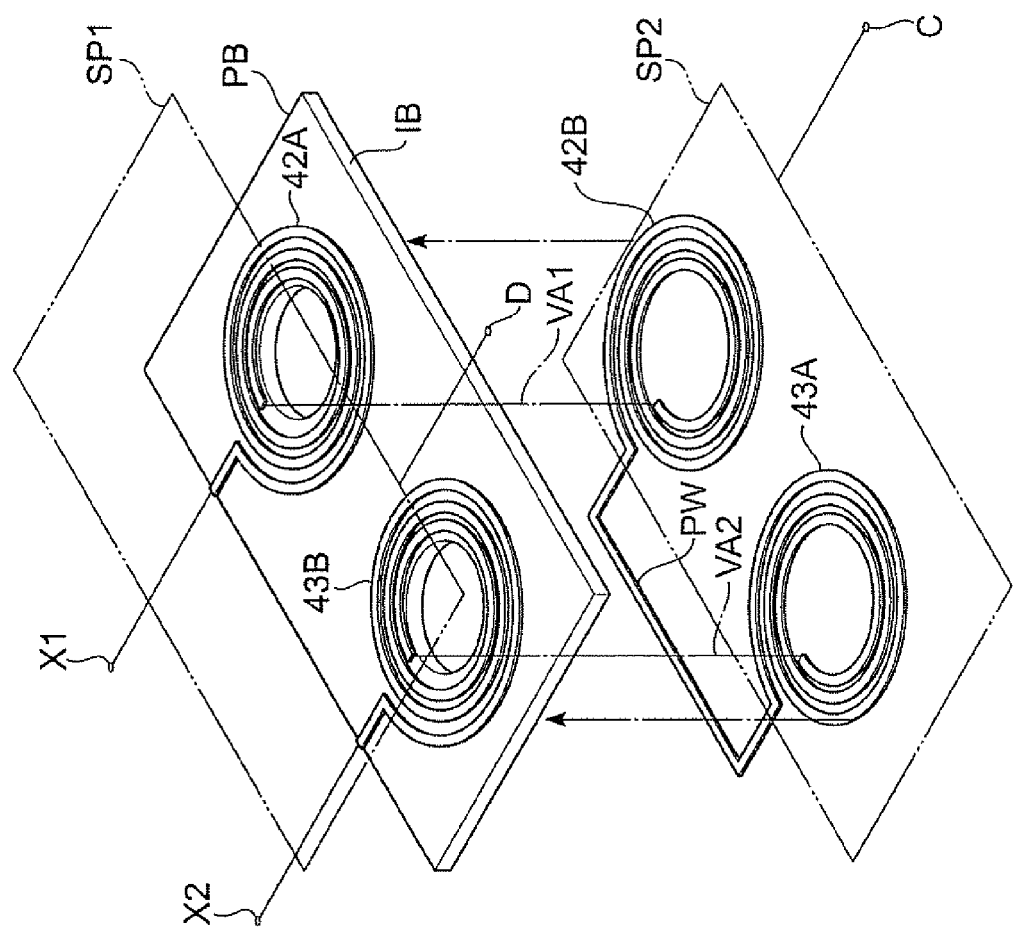
FIG. 5 is a perspective view of a wiring substrate PB.

FIG. 5 is a perspective view of the wiring substrate PB.

The wiring substrate PB comprises an insulating substrate PB, a planar coils 42A and 43A applied to the upper surface of the substrate PB, and planar coils 42B and 43A applied to the lower side of the substrate PB. The upper and lower coils electrically connect the substrate PB via contacts VA1 and VA2 in via holes which pass through the thickness direction. In this structure, there is the advantage that, because there is no need to externally provide the coil connection members, there is a small number of parts.

Figure 6:
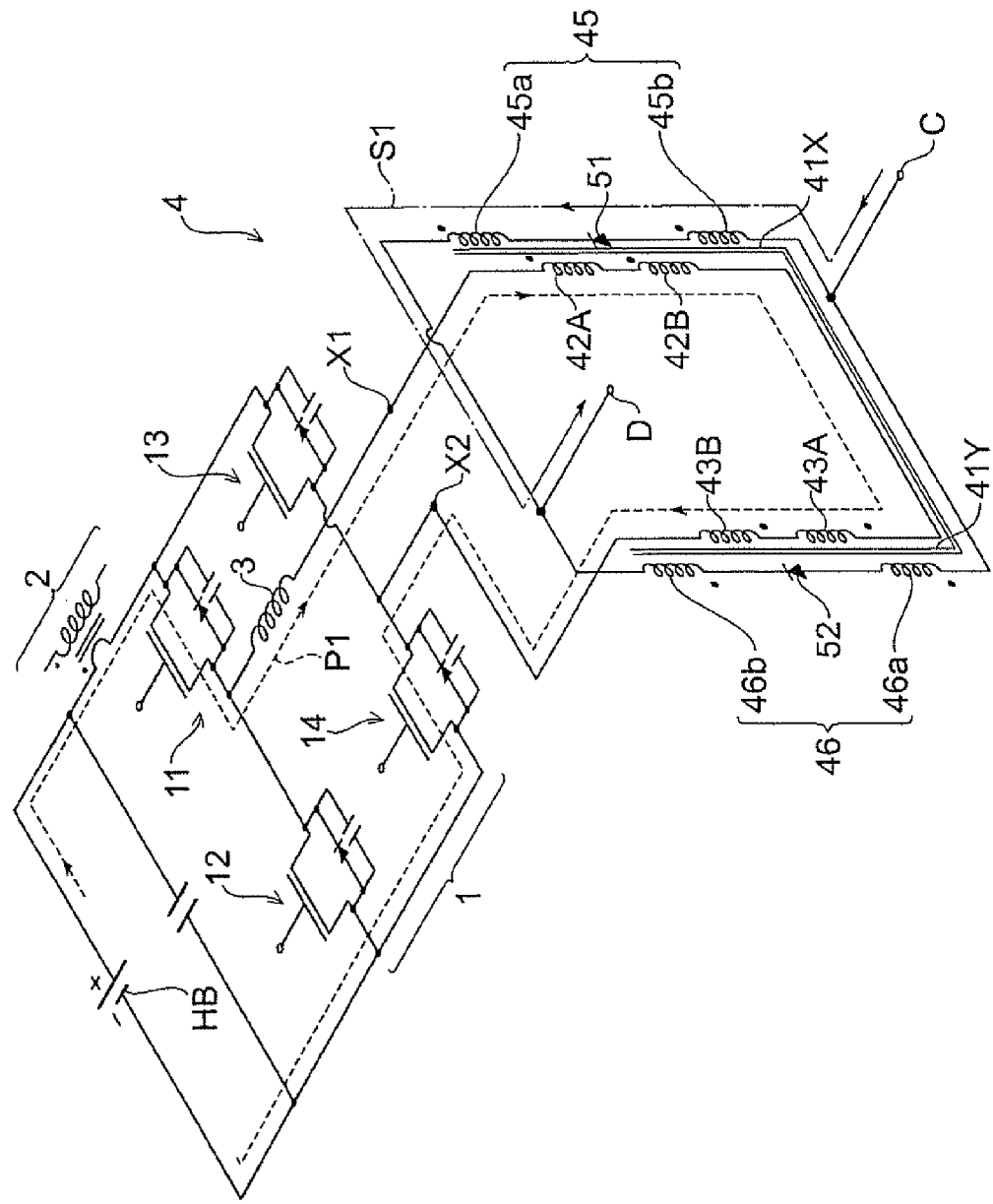
FIG. 6 is the circuit diagram of the DC/DC converter.

FIG. 6 is a circuit diagram of the DC/DC converter.

The secondary coil 45, the primary coils 42A and 42B and the secondary coil 45b are arranged next to the first through section 41X which comprises a magnetic body core in order starting from the top and the secondary coil 46a, the primary coils 43A and 43B, and the secondary coil 46b are arranged next to the second through section 41Y which comprises a magnetic body core in order starting from the bottom.

When the switching elements 11 and 14 are turned ON and switching elements 12 and 14 are turned OFF, current flows along a current path P1. The secondary coil is of the same polarity as the primary coil and a current flows in the secondary coil in the reverse direction from the current path P1 of the primary coil. That is, at this time, the current that flows in from terminal C passes through diode 51 and current path S1 and comes out at terminal D.

Figure 7:
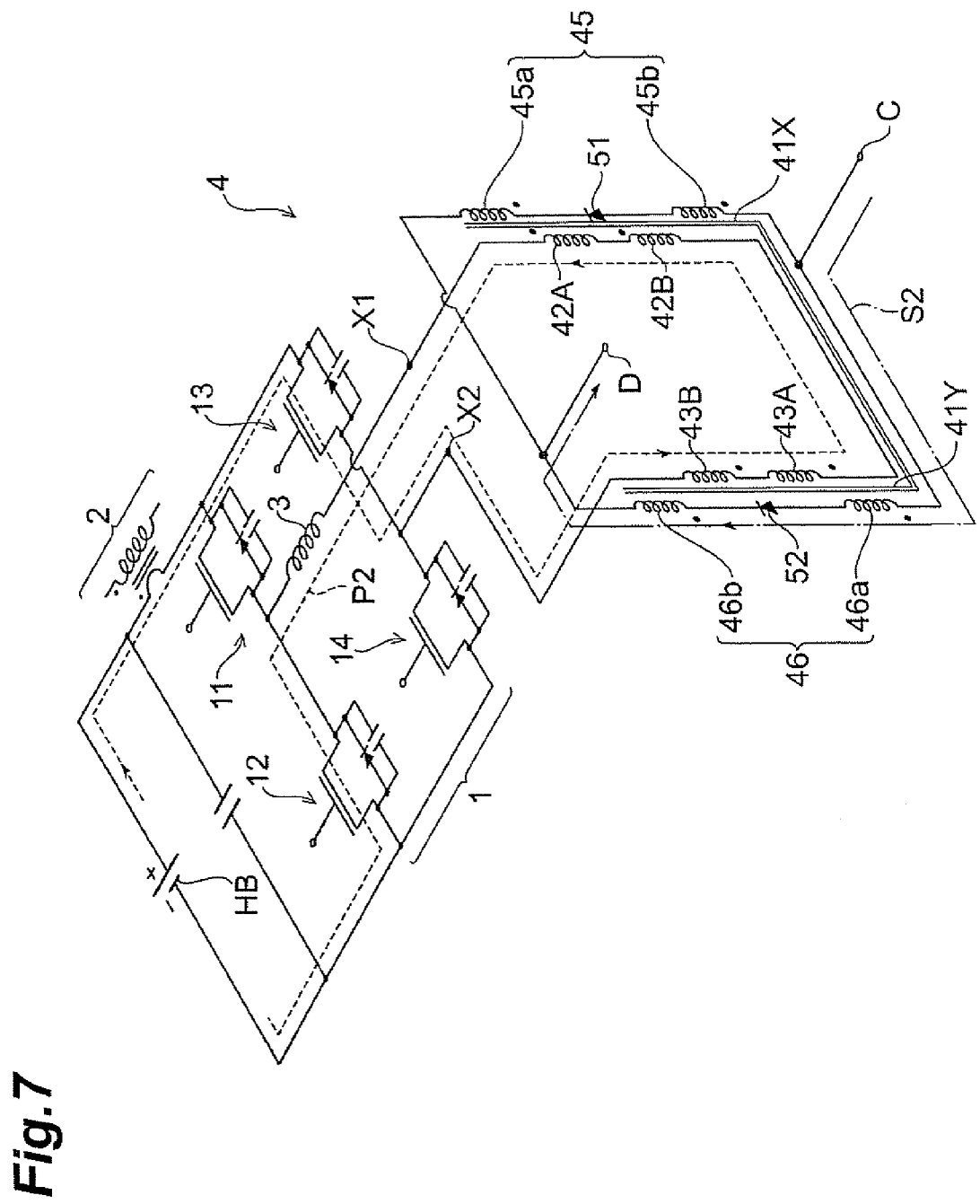
FIG. 7 is a circuit diagram of the DC/DC converter.

FIG. 7 is a circuit diagram of the DC/DC converter.

Thereafter, when the switching elements 11 and 14 are turned OFF and the switching elements 12 and 14 are turned ON, the current flows along the current path P2. The secondary coil has the same polarity as that of the primary coil and a current flows in the secondary coil in the opposite direction from the current path P2 of the primary coil. That is, the current that flows in from terminal C passes through the diode 52 and current path S2 and comes out at terminal D.

Figure 8:
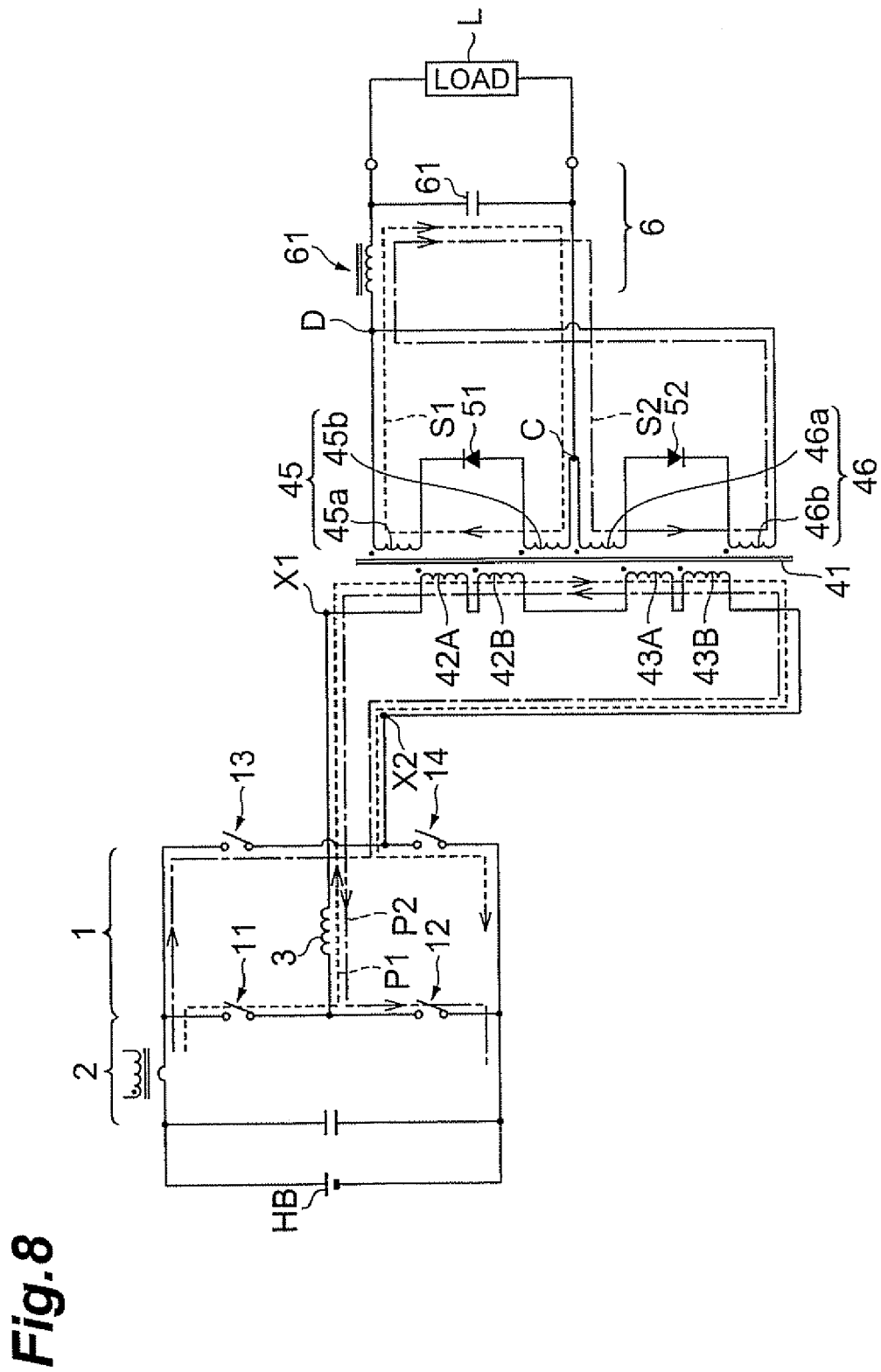
FIG. 8 is a circuit diagram of the DC/DC converter.

When the circuit diagram of the transformer shown in FIGS. 6 and 7 is magnetically developed and the positions of the respective elements are arranged in a way that is easily understood, the circuit diagram shown in FIG. 8 is obtained.

FIG. 8 is a circuit diagram of the DC/DC converter. The circuit diagram is the same as the circuit diagram of the DC/DC converter.

The secondary coil 45a, the primary coils 42A and 42B, the secondary coil 45b, the secondary coil 46a, the primary coils 43A and 43B, and the secondary coil 46b are arranged in order starting from the top along the primary current path P1.

In cases where current flows along the primary current path P1 and current flows along the secondary current path S1 flows, although current flows through diode 51 on the secondary side. However, this current flows into the terminal (node) D, passes through coil 61 and capacitor 62, and returns to terminal C. The current that flows through the primary coils 42A and 42B and the current which flows through the coil 45a and 45b along current path S1 have opposite directions. Hence, the influence of the skin effect and proximity effect is diminished and the AC resistance of the primary coils 42A and 42B is reduced.

In cases where the current flows through the current path P1, the direction of the current which is to flow through the secondary coils 46a and 46b is the opposite direction from the forward current of the diode 52. Hence, current does not flow in the secondary coils 46a and 46b. In this case, although the current is flowing to the primary coils 43A and 43B, a current is not flowing to the adjacent secondary coils and, therefore, the AC resistance of the primary coils 43A and 43B is higher in relative terms than the AC resistance of the primary coils 42A and 42B.

In cases where the current is flowing along the primary current path P2 and current is flowing along the secondary current path S2, although a current is flowing through the diode 52 on the secondary side, this current is flowing into terminal (node) D and passes through coil 61 and capacitor 62 and returns to terminal C. The current flowing through the primary coils 43A and 43B and the current flowing through coils 46a and 46b along current path S2 are in opposite directions and, therefore, the influence of the skin effect and proximity effect are reduced and the AC resistance of the primary coils 43A and 43B is reduced.

In cases where the current flows through the current path P2, the direction of the current which is to flow through the secondary coils 45a and 45b is the opposite direction from the forward current of the diode 51. Hence, current does not flow in the secondary coils 45a and 45b. In this case, although the current is flowing to the primary coils 42A and 42B, a current is not flowing in the adjacent secondary coils and, therefore, the AC resistance of the primary coils 42A and 42B is higher in relative terms than the AC resistance of the primary coils 43A and 43B. The outputs of the secondary coils are smoothed by a smoothing circuit 6 which comprises an LC filter and are supplied as direct current to load L.

As mentioned earlier, in the DC/DC converter, the primary coils 42A and 42B of the first coil group (45b, 42B, 42A, 45a) and the primary coils 43A and 43B of the secondary coil group (46a, 43B, 43A, 46a) are connected in series and the AC resistance of the primary coils 42A and 42B of the first coil group and the AC resistance of the primary coils 43A and 43B of the second coil group are set such that one AC resistance is alternately higher than the other in sync with the switching of inverter circuit 1. When a primary coil with a high AC resistance is connected in series with a primary coil with a low AC resistance, because AC resistance converges the oscillation within the coil group, ringing of the output can be suppressed. Therefore, the power conversion efficiency of the DC/DC converter rises further.

Furthermore, zero volt switching control may be performed by the inverter circuit 1 and, in this case, the loss of the switching elements 11, 12, 13, and 14 can be suppressed.

In addition, in order to increase the current handled by the transformer, a multiplicity of coils are preferably used. However, in order to maintain the symmetry and stability of the respective coil groups, the coils of the first or second coil group are preferably arranged in the one loop direction of the magnetic circuit in the following order: secondary coil, primary coil, and secondary coil, or primary coil, secondary coil, and primary coil. In this case, because the symmetry of the coil arrangement is maintained for the center coils 42A, 42B (43A, 43B), the current distribution of the coil groups is made uniform.

The above circuit will be described next in more detail.

Figure 9:
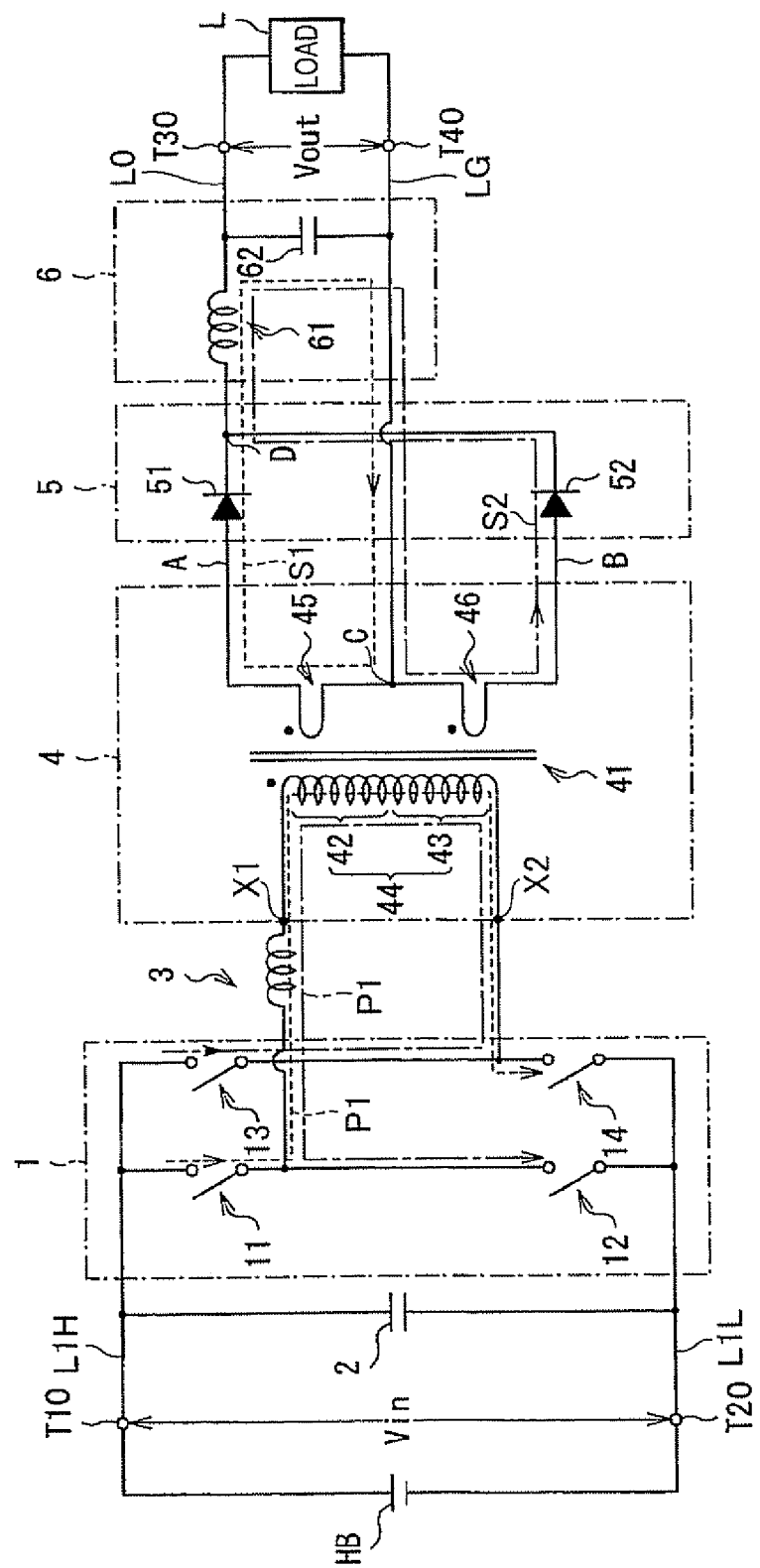
FIG. 9 is a circuit diagram of the DC/DC converter of this embodiment.

FIG. 9 represents the circuit constitution of the DC/DC converter, where the positions of the diodes 51 and 52 differ from those mentioned earlier in that same have moved directly in front of node D.

Figure 10:
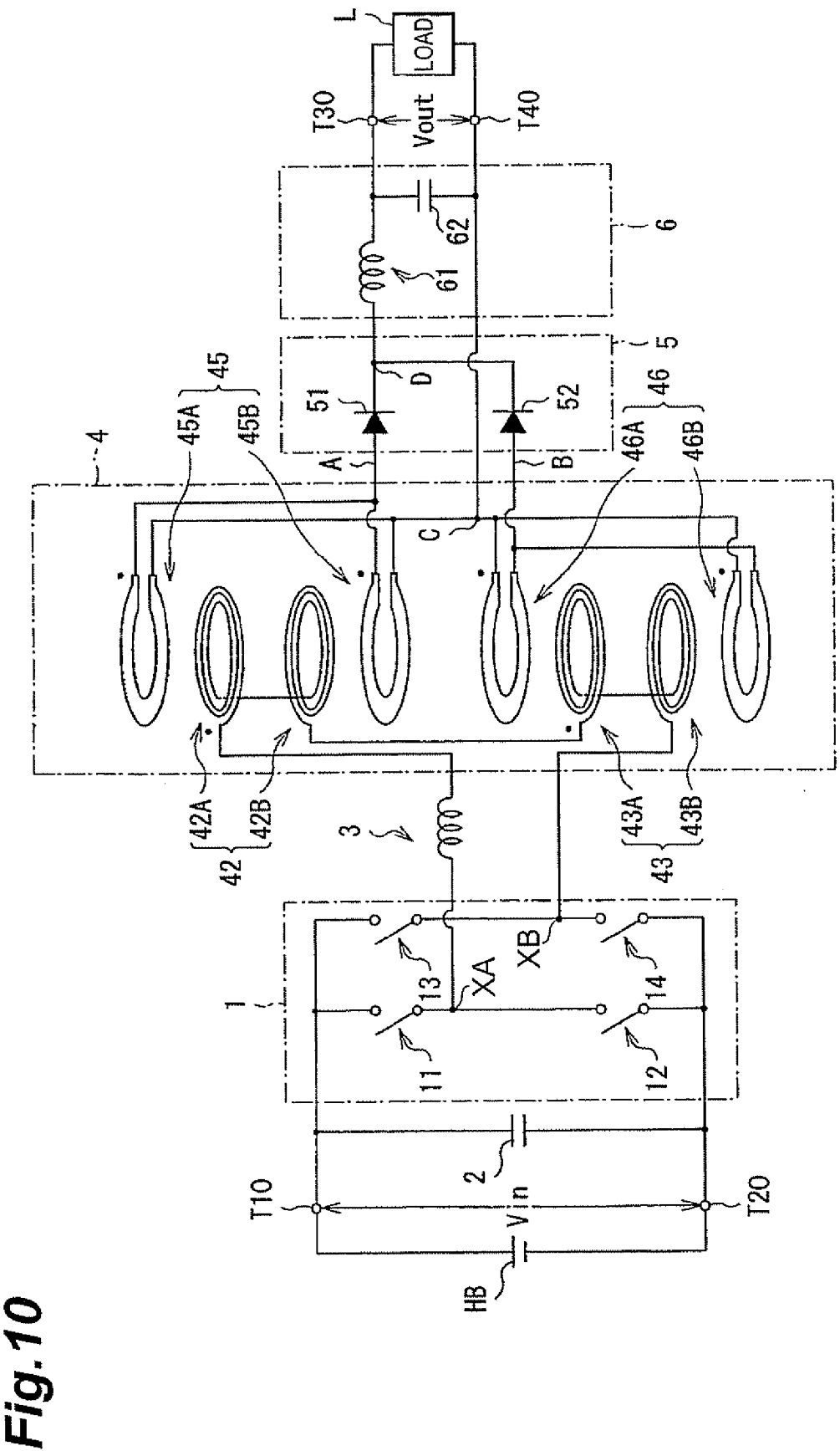
FIG. 10 is a structural diagram of the DC/DC converter.

FIG. 10 shows the structure of the transformer in the DC/DC converter of FIG. 9 in an enlarged form. This DC/DC converter functions as a DC/DC converter which converts a high-voltage DC input voltage Vin which is supplied by power source HB that comprises a high-voltage battery, for example, into a lower DC output voltage Vout and supplies the lower DC output voltage Vout to load L which comprises a low voltage battery, for example, and is a secondary center-tapped DC/DC converter.

The DC/DC converter comprises a primary high-voltage power line L1H, an inverter circuit 1 (switching circuit) and a smoothing capacitor 2 which are provided between the primary high-voltage power line L1H and a low-voltage power line L1L, a transformer 4 which is constituted comprising a primary coil 44 which comprises a primary coil 42 and a primary coil 43 which are connected in series to one another and a secondary coil 47 which comprises a secondary coil 45 and a secondary coil 46 which are connected in series to one another, and a resonance coil (inductor) 3 which is provided between the inverter circuit 1 and transformer 4. The coil may also be wound. An input terminal T10 is provided on primary high-voltage power line L1H and an input terminal T20 is provided on primary low-voltage power line L1L. These input terminals T10 and T20 are connected to the output terminal of power source HB.

An output terminal T30 is provided on an output line L0 which is the high-voltage line of smoothing circuit 6 and an output terminal T40 is provided on ground line LG which is the low-voltage line of smoothing circuit 6. The output terminals T30 and T40 are connected to the I/O terminal of load L.

The inverter circuit 1 is a single-phase inverter circuit which converts DC input voltage Vin which is output by power source HB into a substantially rectangular waveform single-phase AC voltage. The inverter circuit 1 is a full bridge-type switching circuit in which four switching elements 11, 12, 13, and 14 which are each driven by switching signals that are supplied by the control circuit (not shown) are full bridge-connected. Elements such as a MOS-FET (Metal Oxide Semiconductor Field Effect Transistor) or an IGBT (Insulated Gate Bipolar Transistor), for example, are employed as the switching elements.

The switching element 11 is provided between one end of the resonant inductor 3 and the primary high-voltage power line L1F and switching element 12 is provided between one end of the resonant inductor 3 and the primary low-voltage power line L1L. Switching element 13 is provided between one end of the primary coil 43 of the transformer 4 and the primary high-voltage power line L1H and switching element 14 is provided between one end of the primary coil 43 and the primary low-voltage power line L1L.

Accordingly, in the inverter circuit 1, as a result of the ON operation of the switching elements 11 and 14, current flows along the primary current path P1 which extends from the primary high-voltage power line L1H to the primary low-voltage power line L1L by passing the switching element 11, the resonant inductor 3, the primary coil 42, primary coil 43, and switching element 14 in that order, whereas, as a result of the ON operation of the switching elements 12 and 13, current flows in the second current path which extends from the primary high-voltage power line L1H to the primary low-voltage power line L1L by passing the switching element 13, primary coil 43, primary coil 42, resonant inductor 3, and switching element 12 in that order.

The resonant inductor 3 constitutes a resonant circuit together with at least one of the parasitic capacitances of the switching elements 11, 12, 13, and 14 and uses the resonance characteristic to reduce the power loss produced as a result of the ON and OFF action of the switching elements. The resonant inductor 3 may be constituted by actually disposing a coil part or may instead (also) be constituted by using a Series inductance which includes the leakage inductance of the transformer 4 and the wiring and so forth.

The transformer 4 is a magnetic element which is magnetically coupled as a result of being wound on core 41 so that the primary coil 44 (primary coil group) which comprises primary coil 42 (primary first coil group) and primary coil 43 (primary second coil group) which are connected in series to one another, and the secondary coil 47 (secondary coil group) which comprises secondary coil 45 (secondary first coil group) and secondary coil 46 (secondary second coil group) which are connected in series to one another have polarities of the same orientation. The transformer 4 is a step-down transformer and the number of windings of the secondary coil 45 and secondary coil 46 is smaller than the number of windings of the primary coil 44. The magnitude of the voltage step-down is decided by the ratio between the number of windings of the primary coil 44 and the number of windings of each of the secondary coil 45 and secondary coil 46.

In addition to combining a U-shape type with a U-shape type for core 41 as mentioned earlier, a combination of a U-shape type and an I-shape type can be employed, in which case the core 41 has an annular magnetic path.

The secondary coil 45 comprises a secondary coil 45A (secondary first subcoil group) and a secondary coil 45B (secondary second subcoil group) which are connected to one another in parallel. The secondary coil 46 comprises a secondary coil 46A (secondary third subcoil group) and a secondary coil 46B (secondary fourth subcoil group) which are connected to one another in parallel. The secondary coil 45A, secondary coil 45B, secondary coil 46A and secondary coil 46B are wound around the core 41.

One end of the secondary coil 45 is connected to the anode of the diode 51 and the other end of the secondary coil 45 is connected to center tap (terminal) C. Meanwhile, one end of the secondary coil 46 is connected to the anode of a diode 52 (described subsequently) while the other end of the secondary coil 46 is connected to center tap C. Center tap C is connected to the output terminal T40 via a ground line LG. That is, the secondary winding of the transformer 4 is a center tap-type connection. The secondary coil 45 and secondary coil 46 are driven in mutually opposite phases with time division by the rectification circuit 5.

The primary coil 42 comprises a primary coil 42A (primary first subcoil group) and a primary coil 42B (primary second subcoil group) which are connected to one another in series. The primary coil 42A and primary coil 42B are each wound around the core 41 three times. In addition, the primary coil 42 is sandwiched between the secondary coil 45A and the secondary coil 45B, the primary coil 42A is disposed close to the secondary coil 45A, and the primary coil 42B is disposed close to the secondary coil 45B. The primary coil 42 is disposed closer to the secondary coil 45 than to the secondary coil 46.

The primary coil 43 comprises primary coil 43A (primary third subcoil group) and primary coil 43B (primary fourth subcoil group) which are connected in series to one another. The primary coils 43A and primary coil 43B are each wound three times around the core 41. In addition, the primary coil 43 is sandwiched between secondary coil 46A and secondary coil 46B, the primary coil 43A is disposed adjacent to the secondary coil 46A, and the primary coil 43B is disposed adjacent to the secondary coil 46B. The primary coil 43 is disposed closer to the secondary coil 46 than to the secondary coil 45.

As a result, the transformer 4 comprises a structure in which the primary coils (primary coils 42 and 43) and the secondary coils (secondary coils 45 and 46) are alternately stacked (in a sandwich shape) and the primary coil 42 and primary coil 43 in which the current flows in the same direction are close to one another on the same axis. Furthermore, the respective coils of the transformer 4 has an arrangement of coils which follows a loop in one direction of the magnetic path in which the coils are stacked in the following order: secondary coil 45A (secondary first subcoil group), primary coil 42A (primary first subcoil group), primary coil 42B (primary second subcoil group), secondary coil 45B (secondary second subcoil group), secondary coil 46A (secondary third subcoil group), primary coil 43A (primary third subcoil group), primary coil 43B (primary fourth subcoil group), and secondary coil 46B (secondary fourth subcoil group). The stacked structure of the transformer 4 is symmetrical along the loop.

The primary coil 42 and primary coil 43 are connected to the inverter circuit 1 so that the direction of the current which flows into the primary coil 42 and primary coil 43 changes depending on the operation of the inverter circuit 1. More specifically, one end of the primary coil 42 is connected to connection point XA between the switching element 11 and switching element 12 via the resonant inductor 3; the other end of the primary coil 42 is connected to one end of the primary coil 43; and the other end of the primary coil 43 is connected to connection point XB between switching element 13 and switching element 14.

Primary coil 42A, primary coil 42B, primary coil 43A, primary coil 43B, secondary coil 45, secondary coil 45B, secondary coil 46A, and secondary coil 46B may also be isolated from one another by air or may be isolated from one another through the interposition of an insulating sheet (not shown).

Figure 11:
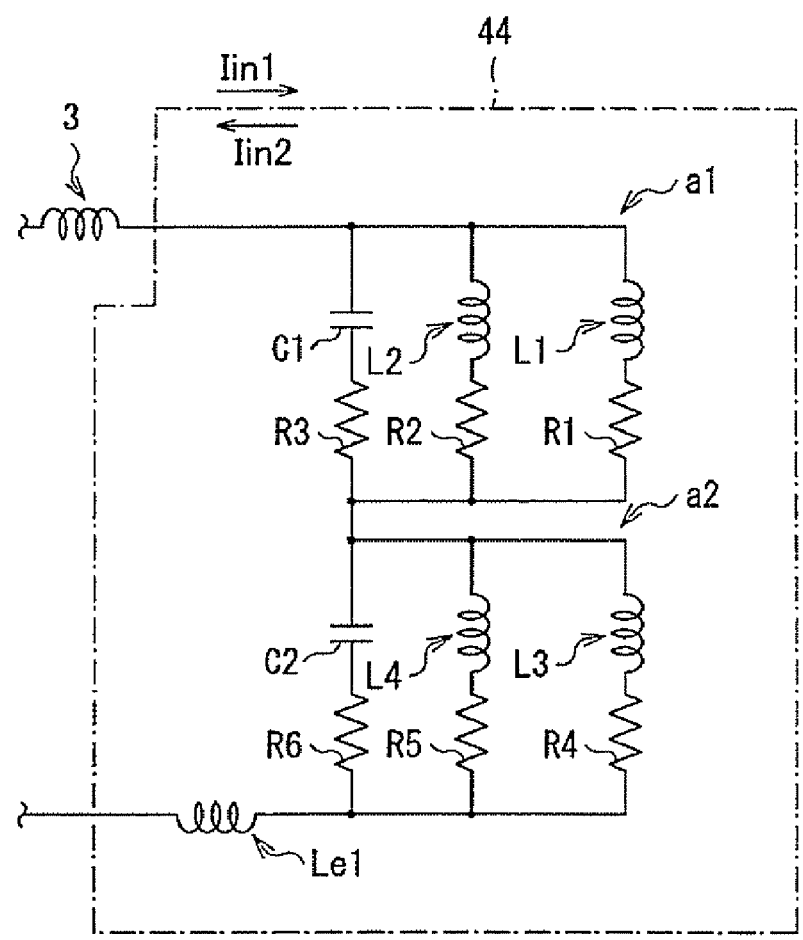
FIG. 11 is an equivalent circuit diagram of the primary coil of the transformer.

The primary coil 44 which comprises the primary coil 42 and primary coil 43 can be represented by an equivalent circuit such as the one shown in FIG. 11. In other words, this equivalent circuit is a circuit in which a circuit a1, circuit a2, and inductance Le1 are connected in series to one another. Circuit a1 is constituted by connecting an inductance L1 and resistance R1 which are connected in series to one another, an inductance L2 and resistance R2 which are connected in series to one another, and a line capacitance C1 and resistance R3 which are connected in series to one another, in parallel to one another. Circuit a2 is constituted by connecting an inductance L3 and resistance R4 which are connected in series to one another, an inductance L4 and resistance R5, which are connected in series to one another, and a line capacitance C2 and resistance R6, which are connected in series to one another, in parallel to one another.

The inductance L1 is the inductance of the primary coil 42 when the transformer 4 is an ideal transformer and resistance R1 is the resistance of the primary coil 42 when the transformer 4 is an ideal transformer. The inductance L2 is the excitation inductance of the primary coil 42 and resistance R2 is the AC resistance part of the primary coil 42. The line capacitance C1 is the total capacitance of the line capacitance in the primary coil 42 and the line capacitance of the primary coil 42 and secondary coils 45 and 46 and the resistance R3 is the AC resistance part of the primary coil 42. The inductance L3 is the inductance of the primary coil 43 when the transformer 4 is an ideal transformer and the resistance R4 is the resistance of the primary coil 43 when the transformer 4 is an ideal transformer. The inductance L4 is the excitation inductance of the primary coil 43 and the resistance R5 is the AC resistance part of the primary coil 43. The line capacitance C2 is the total capacitance of the line capacitance of the primary coil 43 and the line capacitances of the primary coil 43 and secondary coils 45 and 46 and the resistance R6 is the AC resistance component of the primary coil 43. The inductance Le1 is the excitation inductance of the transformer 4.

The rectification circuit 5 is a single-phase full wave rectification-type circuit which comprises a pair of diodes 51 (first rectifying element) and a diode 52 (second rectifying element). The anode of the diode 51 is connected to one end of the secondary coil 45 and the cathode of the diode 51 is connected to connection point D. The anode of the diode 52 is connected to one end of the secondary coil 46 and the cathode of the diode 52 is connected to connection point D. Connection point D is connected to the output terminal T30 via smoothing circuit 6. As a result, the rectification circuit 5 drives the secondary coil 45 and secondary coil 46 in mutually opposite phases with time division.

The smoothing circuit 6 is constituted comprising a choke coil 61 and a smoothing capacitor 62 and generates a DC output voltage Vout by smoothing the DC voltage rectified by the rectification circuit 5 and supplies the DC output voltage Vout from the output terminals T30 and T40 to the load L.

The action of the DC/DC converter with the above constitution will be described next. Although a case where the inverter circuit 1 is driven by a general switching operation was described hereinbelow, the inverter circuit 1 can also be driven through zero volt switching control, for example.

When the switching elements 11 and 14 of the inverter circuit 1 are turned ON, current flows in the direction of the switching element 14 from the switching element 11, a voltage Vin1 appears in the primary coil 44 of the transformer 4, and a current Iin1 flows in the primary coil 42 and primary coil 43 which constitute the primary coil 44. However, a voltage which has a reverse bias with respect to diode 52 and a forward bias with respect to diode 51 appears in the secondary coils 45 and 46 of transformer 4. Hence, current Iout1 flows to the output line LO and ground line LG via the secondary coil 45, diode 51, choke coil 61, and smoothing capacitor 62. Here, a voltage Vout which has been smoothed by the smoothing circuit 6 is output to the output terminals T30 and T40 which are connected in parallel to the smoothing capacitor 62.

Thereafter, when the switching elements 11 and 14 are turned OFF from ON, a voltage with a forward bias with respect to diode 52 appears in the secondary coils 45 and 46 of transformer 4. Hence, current flows to the output line LO and ground line LG via the secondary coil 46, diode 52, choke coil 61, and smoothing capacitor 62. Thereupon, a voltage Vout which has been smoothed by the smoothing circuit 6 is output to the output terminals T30 and T40 which are connected in parallel to the smoothing capacitor 62.

Thereafter, when the switching elements 12 and 13 are turned ON, current flows from switching element 13 in the direction of the switching element 12, a voltage Vin2 appears in the primary coil 44 of the transformer 4, and a current Iin2 flows in the primary coils 42 and 43 which constitute primary coil 44. However, a voltage which has a forward bias with respect to diode 52 and a reverse bias with respect to diode 51 appears in the secondary coils 45 and 46 of transformer 4. Hence, a current Iout2 flows to the output line LO and ground line LG via the secondary coil 46, diode 52, choke coil 61, and smoothing capacitor 62. Thereupon, the voltage Vout which has been smoothed by the smoothing circuit 6 is output to the output terminals T30 and T40 which are connected in parallel to the smoothing capacitor 62.

Ultimately, when the switching elements 12 and 13 are turned from ON to OFF, a voltage which has a forward bias with respect to diode 51 appears in the secondary coils 45 and 46 of transformer 4. Hence, current flows to output line LO and ground line LG via the secondary coil 45, diode 51, choke coil 61, and smoothing capacitor 62. Thereupon, the voltage Vout which is smoothed by the smoothing circuit 6 is output to the output terminals T30 and T40 which are connected in parallel to the smoothing capacitor 62.

Thus, the DC/DC converter converts (steps down) the DC input voltage Vin which was supplied by the power source into the DC output voltage Vout and supplies the DC output voltage Vout thus converted to the load.

The effects of the DC/DC converter of this embodiment will be described next in contrast with a comparative example.

Figure 12:
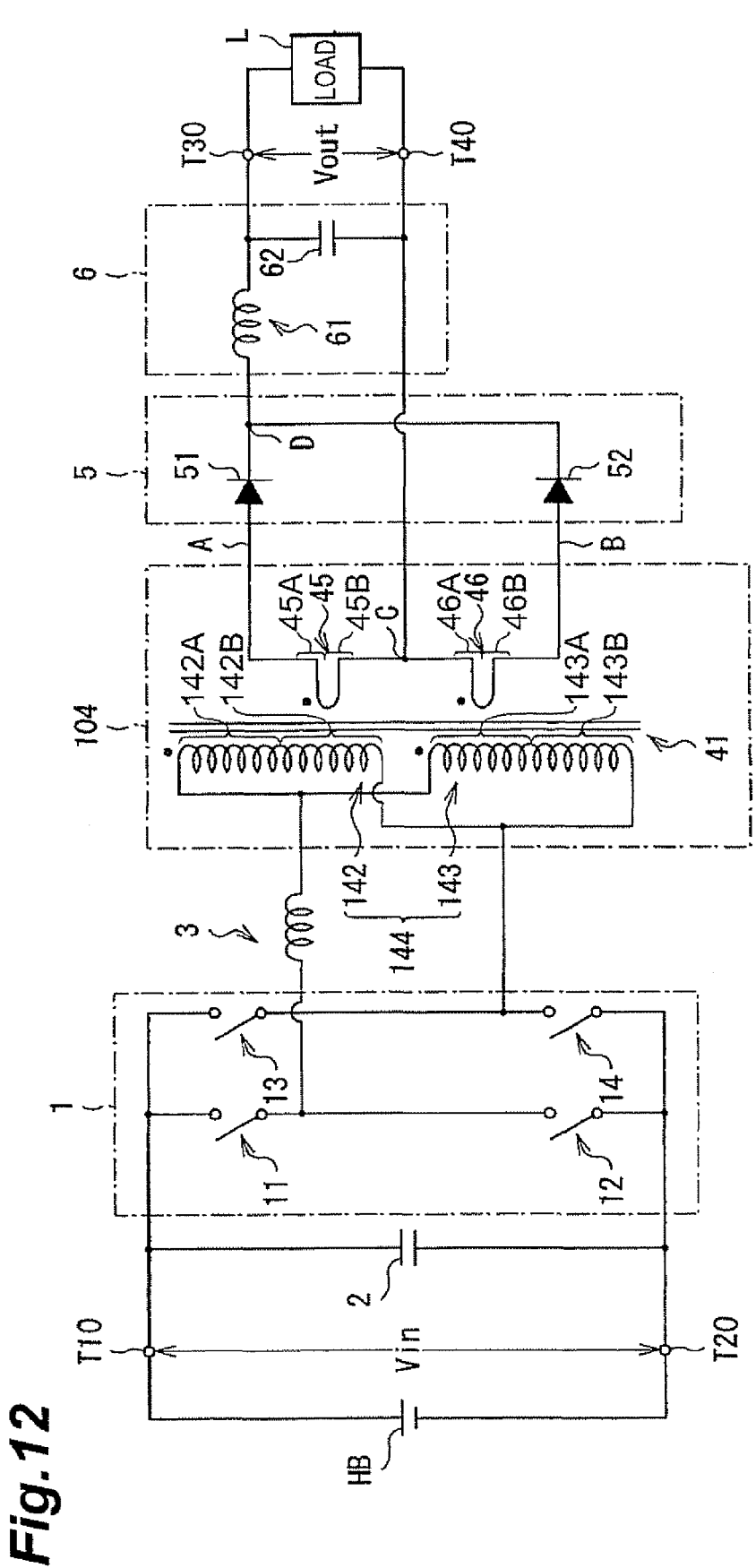
FIG. 12 is a circuit diagram of the DC/DC converter according to a comparative example.

In the comparative example, as shown in FIG. 12, the primary coil 144 of a transformer 104 is constituted by connecting a primary coil 142 and a primary coil 145 in parallel and differs from the primary coil 44 of this embodiment in this respect.

Like the primary coil 42 of this embodiment, the primary coil 142 of the comparative example has a primary coil 142A and a primary coil 142B which are connected in series to one another. The primary coil 142A and primary coil 142B are each wound six times around core 41 and are stacked in that order starting from the top. From the perspective of arranging the magnitudes of the voltage step-downs by the transformer between the embodiment and comparative example, the number of windings of the primary coil 142 is two times the number of windings of the primary coil 42, that is, twelve windings. In addition, the primary coil 142 is sandwiched between the secondary coil 45A and the secondary coil 45B and the primary coil 142A is disposed close to the secondary coil 45A and the primary coil 142B is disposed close to the secondary coil 45B. As a result, the primary coil 142 is disposed closer to the secondary coil 45 than the secondary coil 46.

The primary coil 143 of the comparative example comprises a primary coil 143A and primary coil 143B which are connected in series to one another. The primary coil 143A and primary coil 143B are wound three times around core 41 and stacked in that order starting from the top. From the perspective of arranging the voltage step-downs by the transformer between the embodiment and comparative example, the number of windings of the primary coil 143 is two times the number of windings of the primary coil 43, that is, twelve windings. In addition, the primary coil 143 is sandwiched between the secondary coil 46A and the secondary coil 4613 and the primary coil 143A is disposed close to the secondary coil 46A and the primary coil 143B is disposed close to the secondary coil 46B. As a result, the primary coil 143 is disposed closer to the secondary coil 46 than the secondary coil 45.

Figure 13:
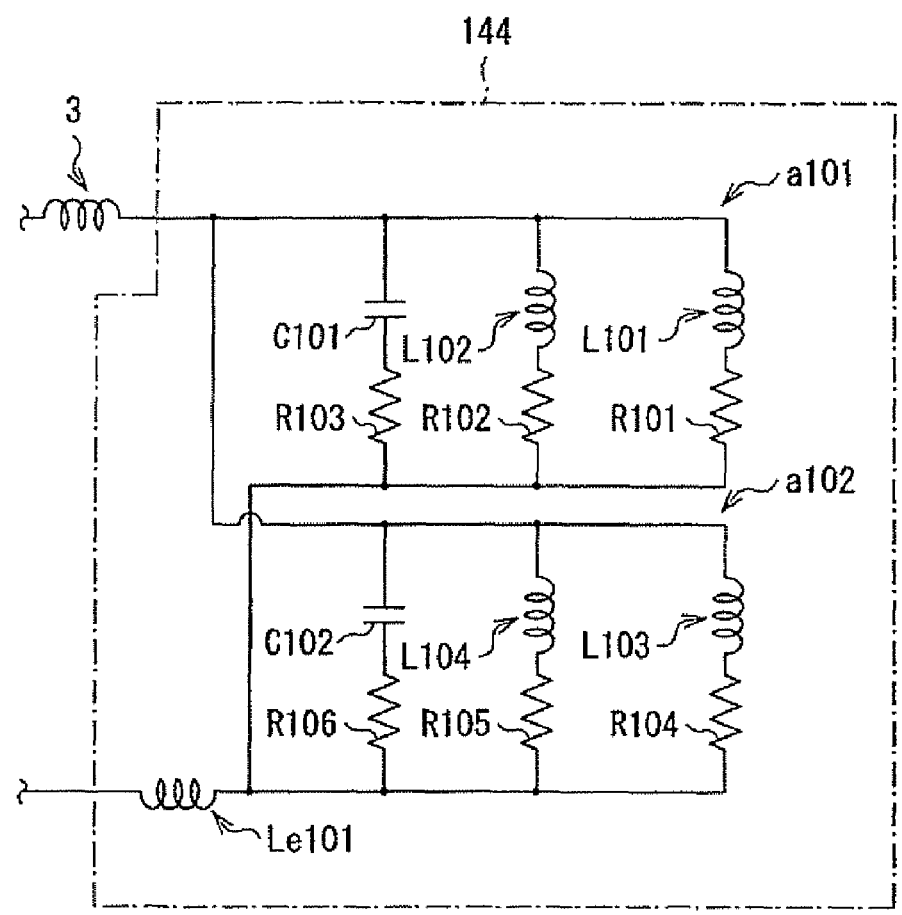
FIG. 13 is an equivalent circuit diagram of the primary coil of the transformer.

Here, the primary coil of the transformer 104 of the comparative example, that is, the primary coil 144 which comprises the primary coil 142 and primary coil 143 can be represented by an equivalent circuit of the kind shown in FIG. 13. That is, the equivalent circuit is a circuit in which a circuit in which circuit a101 and a circuit a102 are connected in parallel to one another and the inductance Le101 are connected in series to one another. Circuit a101 is constituted by connecting an inductance L101 and resistance R101 which are connected in series to one another, an inductance L102 and resistance R102 which are connected in series to one another, and a line capacitance C101 and resistance R103 which are connected in series to one another, in parallel to one another. Circuit a102 is constituted by connecting an inductance L103 and resistance R104 which are connected in series to one another, an inductance L104 and resistance R105 which are connected in series to one another, and a line capacitance C102 and resistance R106 which are connected in series to one another, in parallel to one another.

As mentioned earlier, the inductance L100 is the inductance of the primary coil 142 when the transformer 104 is an ideal transformer and resistance R101 is the resistance of the primary coil 142 when the transformer 104 is an ideal transformer. The inductance L102 is the excitation inductance of the primary coil 142. The resistance R102 is the AC resistance component of the primary coil 142. The line capacitance C101 is the total capacitance of the line capacitance in the primary coil 142 and the line capacitances of the primary coil 142 and secondary coils 45 and 46 and the resistance R103 is the AC resistance component of the primary coil 142. The inductance L103 is the inductance of the primary coil 143 when the transformer 104 is an ideal transformer and the resistance R104 is the resistance of the primary coil 143 when the transformer 104 is an ideal transformer. The inductance L104 is the excitation inductance of the primary coil 143 and the resistance R105 is the AC resistance component of the primary coil 143. The line capacitance C102 is the total capacitance of the line capacitance in the primary coil 143 and the line capacitances of the primary coil 143 and the secondary coils 45 and 46 and the resistance R106 is the AC resistance component of the primary coil 143. The inductance Le101 is the excitation inductance of the transformer 104.

Figure 14:
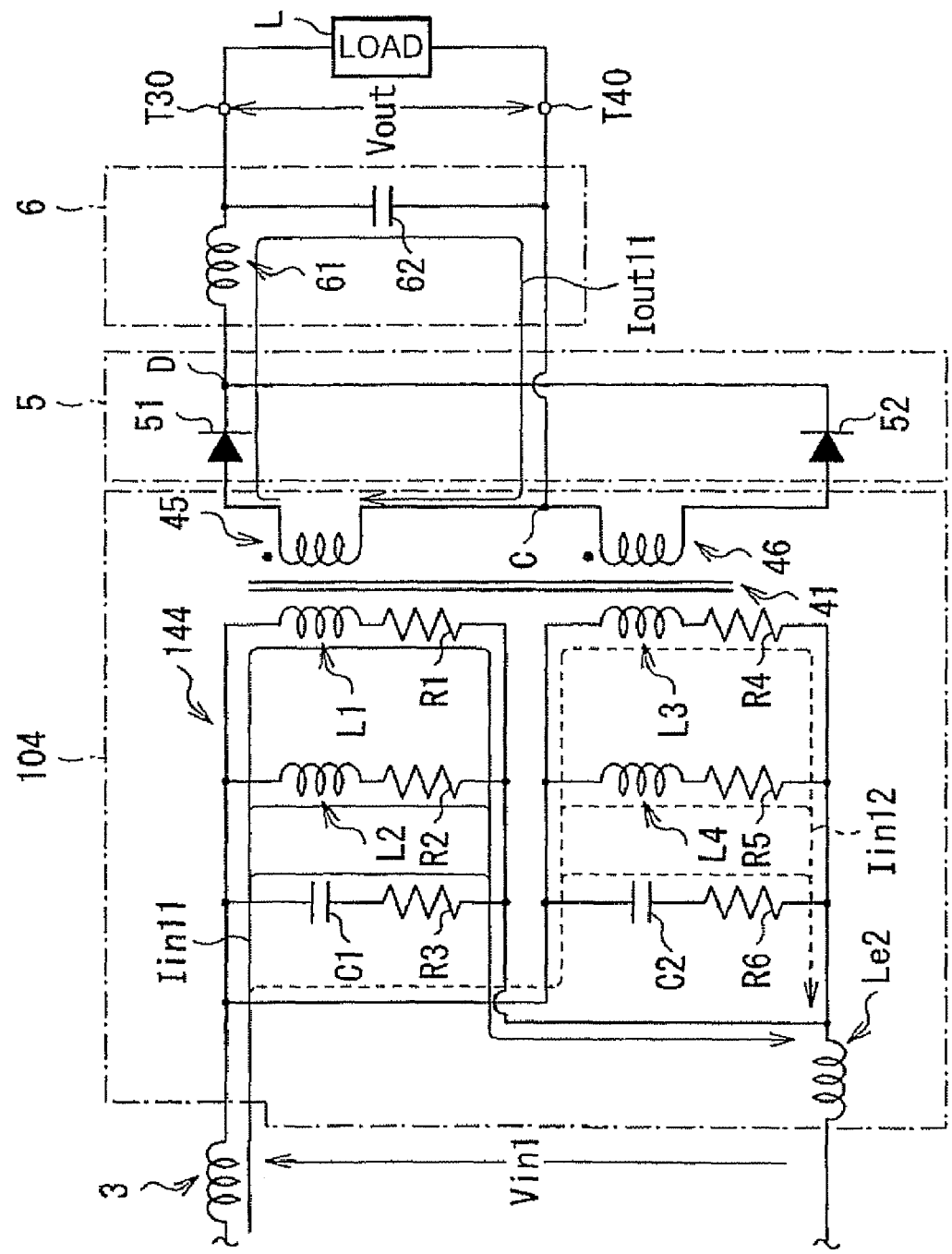
FIG. 14 is a circuit diagram which serves to illustrate the operation of the DC/DC converter.

In the comparative example, as shown in FIG. 14, when voltage Vin1 is input to the primary coil 144, a current Iin11 flows in the primary coil 142 and a current Iin12 flows in the primary coil 143. Here, the primary coil 142 is disposed closer to the secondary coil 45 in which the current flows and is therefore tightly magnetically coupled to the secondary coil 45. Here, the primary coil 142 and secondary coil 45 have, based on the principles of the transformer, currents which flow in mutually opposite directions. Therefore, in comparison with a case where coil groups which have the same current flow direction are adjacent in the primary coil 142, the AC resistance drops because the influence of the proximity effect drops. Accordingly, a relatively large current flows in the primary coil 142. However, the primary coil 143 is disposed farther from the secondary coil 45 in which the current flows and is loosely magnetically coupled to the secondary coil 45. Here, because the primary coil 143 is disposed relatively close to the secondary coil 46 in which the current does not flow, the AC resistance in the primary coil 143 is higher as a result of the proximity effect than that of the primary coil 142. Only a relatively small current therefore flows in the primary coil 143.

Figure 15:
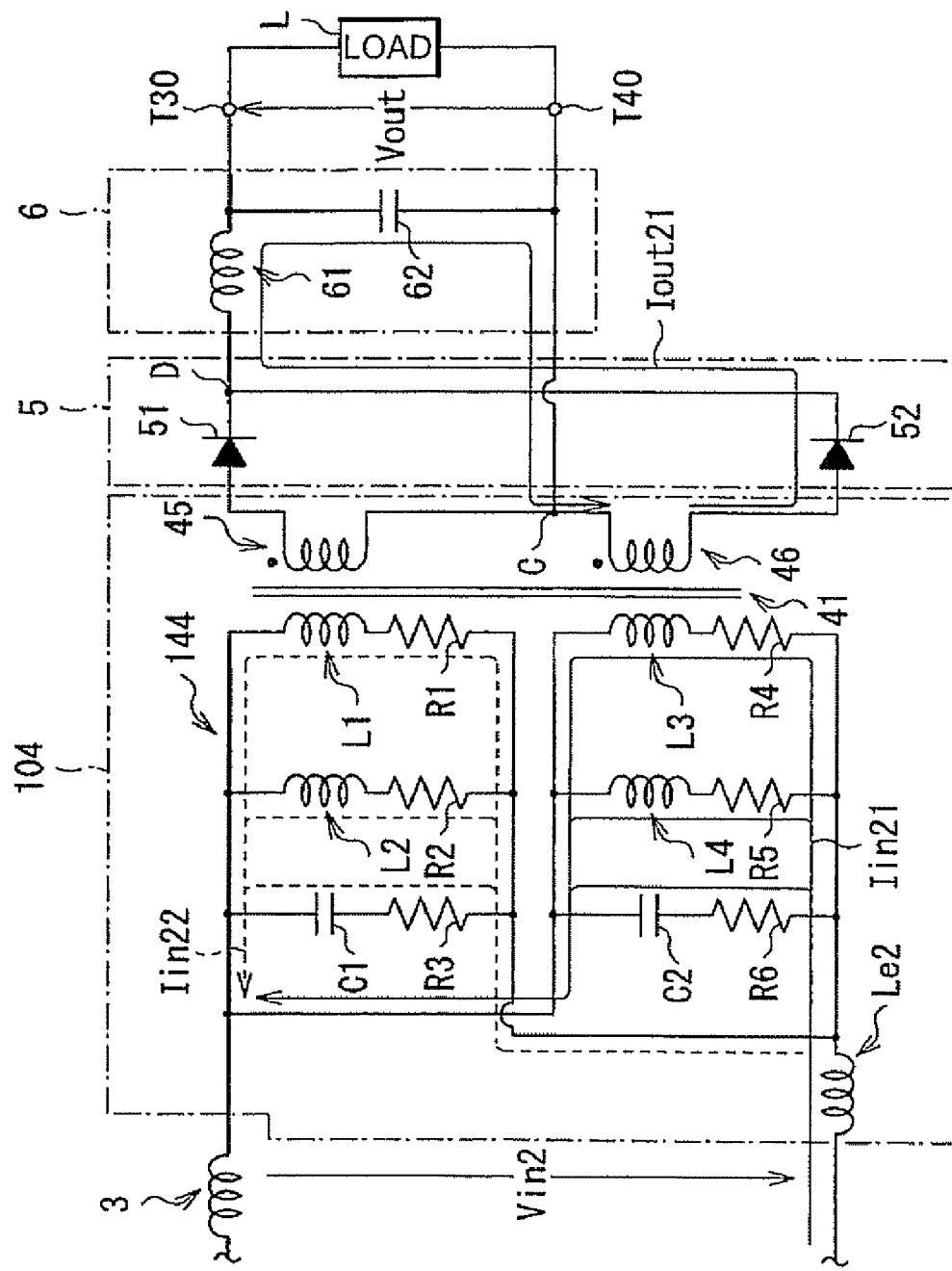
FIG. 15 is another circuit diagram which serves to illustrate the operation of the DC/DC converter.

Furthermore, as shown in FIG. 15, when the voltage Vin2 is input to the primary coil 144, the current Iin22 flows in the primary coil 142 and the current Iin21 flows in the primary coil 143. Here, the primary coil 143 is disposed closer to the secondary coil 46 in which the current flows and is therefore relatively tightly magnetically coupled to the secondary coil 46. Here, the primary coil 143 and secondary coil 46 have, based on the principles of a transformer, currents which flow in mutually opposite directions. Therefore, in comparison with a case where coil groups which have the same current flow direction are adjacent in the primary coil 143, the AC resistance drops because the influence of the proximity effect drops. Accordingly, a relatively large current flows in the primary coil 143. However, the primary coil 142 is disposed farther from the secondary coil 46 in which the current flows and is therefore relatively loosely magnetically coupled to the secondary coil 46. Here, because the primary coil 142 is disposed relatively close to the secondary coil 45 in which the current does not flow, the AC resistance in the primary coil 142 is higher as a result of the proximity effect than that of the primary coil 143. Only a relatively small current therefore flows in the primary coil 142.

Figure 16:
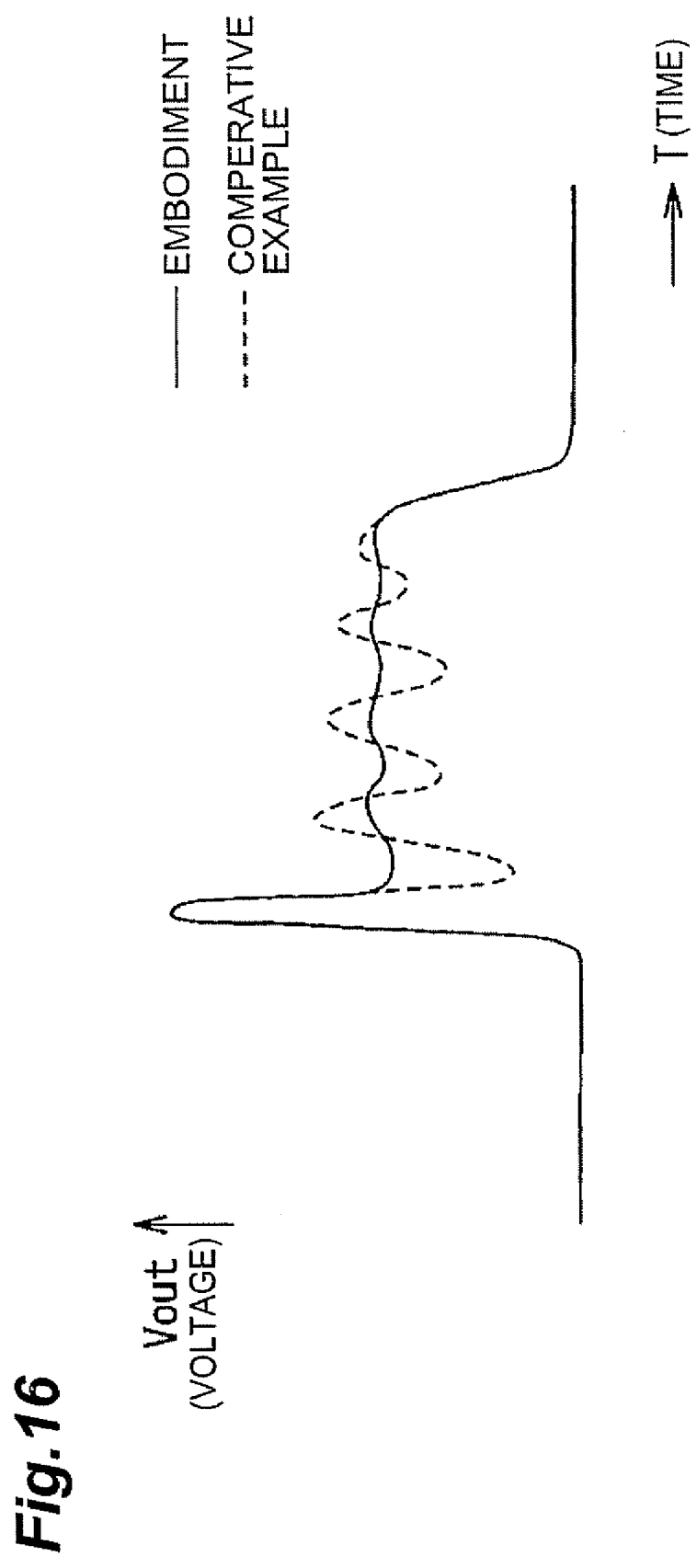
FIG. 16 is a circuit diagram of a waveform diagram of the output AC voltage of the transformer.

Thus, in the comparative example, because the primary coil 142 and primary coil 143 are connected in parallel to one another, a larger amount of current flows in the coil with the lower AC resistance. Hence, ringing which is generated in the output AC voltage (the voltage across the ends A and B in FIG. 12) of the transformer 104 which is produced as a result of the LC resonance caused by of the line capacitances C1 and C2 of the transformer 104, the excitation inductances L2 and L4 of the transformer 104, and the excitation inductance Le1 of the transformer 104 can barely be attenuated by a low AC resistance (See waveform indicated by the dotted line in FIG. 16). As a result, the core loss of the transformer 104 and the amount of heat generated by the AC resistance of the transformer 104 increase and the efficiency drops.

Figure 17:
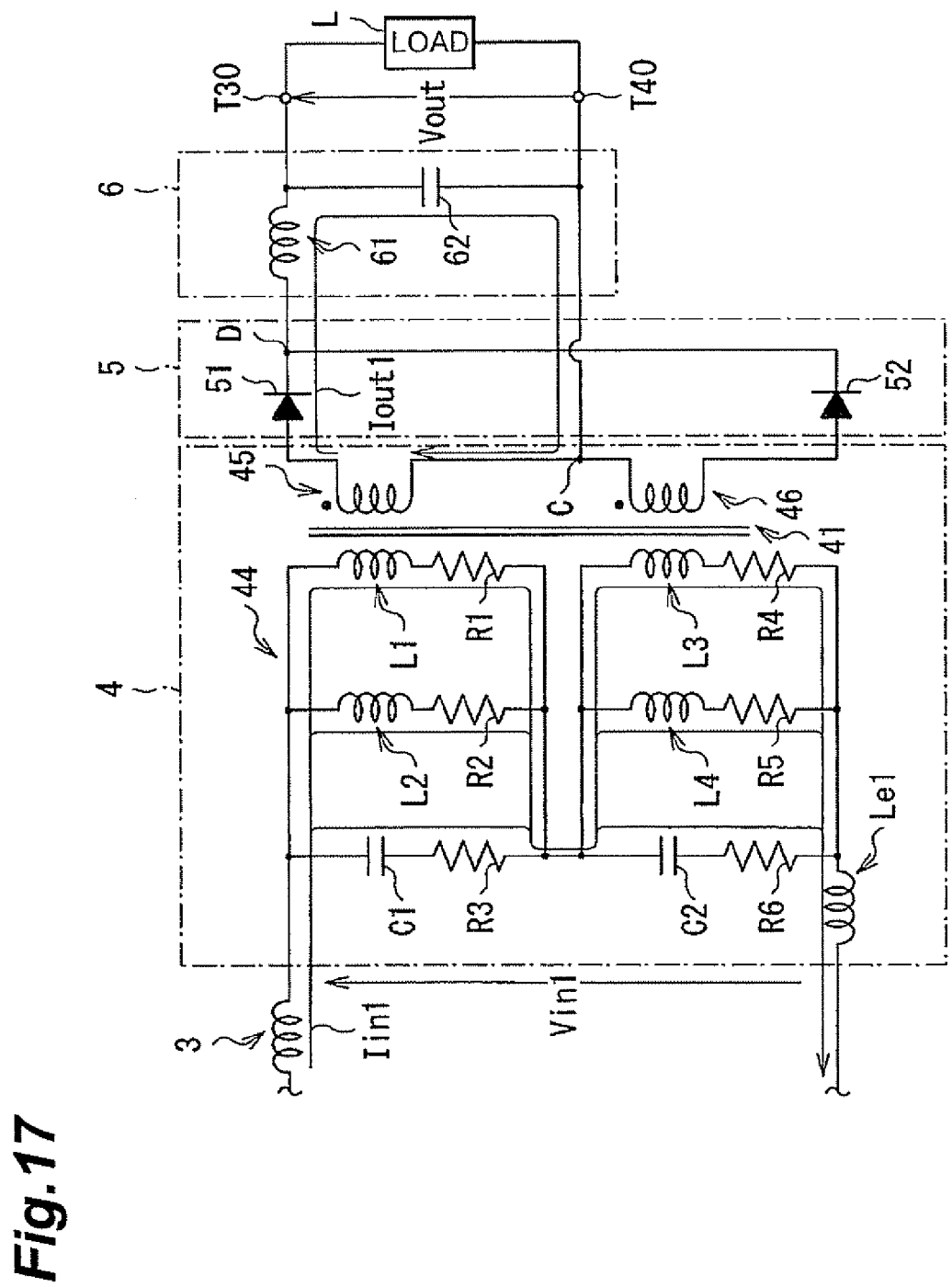
FIG. 17 is a circuit diagram which serves to illustrate the operation of the DC/DC converter.

However, in is embodiment, as shown in FIG. 17, when voltage Vin1 is input to the primary coil 44, a current Iin1 flows in the primary coil 42 and primary coil 43 which constitute the primary coil 44. Here, the primary coil 42 is disposed closer to the secondary coil 45 in which the current flows and is therefore relatively tightly magnetically coupled to the secondary coil 45. Here, the primary coil 42 and secondary coil 45 have, based on the principles of a transformer, currents which flow in mutually opposite directions. Therefore, in comparison with a case where coil groups which have the same current flow direction are adjacent, the AC resistance in the primary coil 42 drops because the influence of the proximity effect drops. However, the primary coil 43 is disposed farther from the secondary coil 45 in which the current flows and is therefore relatively loosely magnetically coupled to the secondary coil 45. Here, because the primary coil 43 is disposed closer to the secondary coil 46 in which the current does not flow, the AC resistance in the primary coil 43 is higher as a result of the proximity effect than that of the primary coil 42. However, in this embodiment, because the primary coil 42 and primary coil 43 are connected in series to one another, mutually equal currents flow in the primary coil 42 and primary coil 43.

Figure 18:
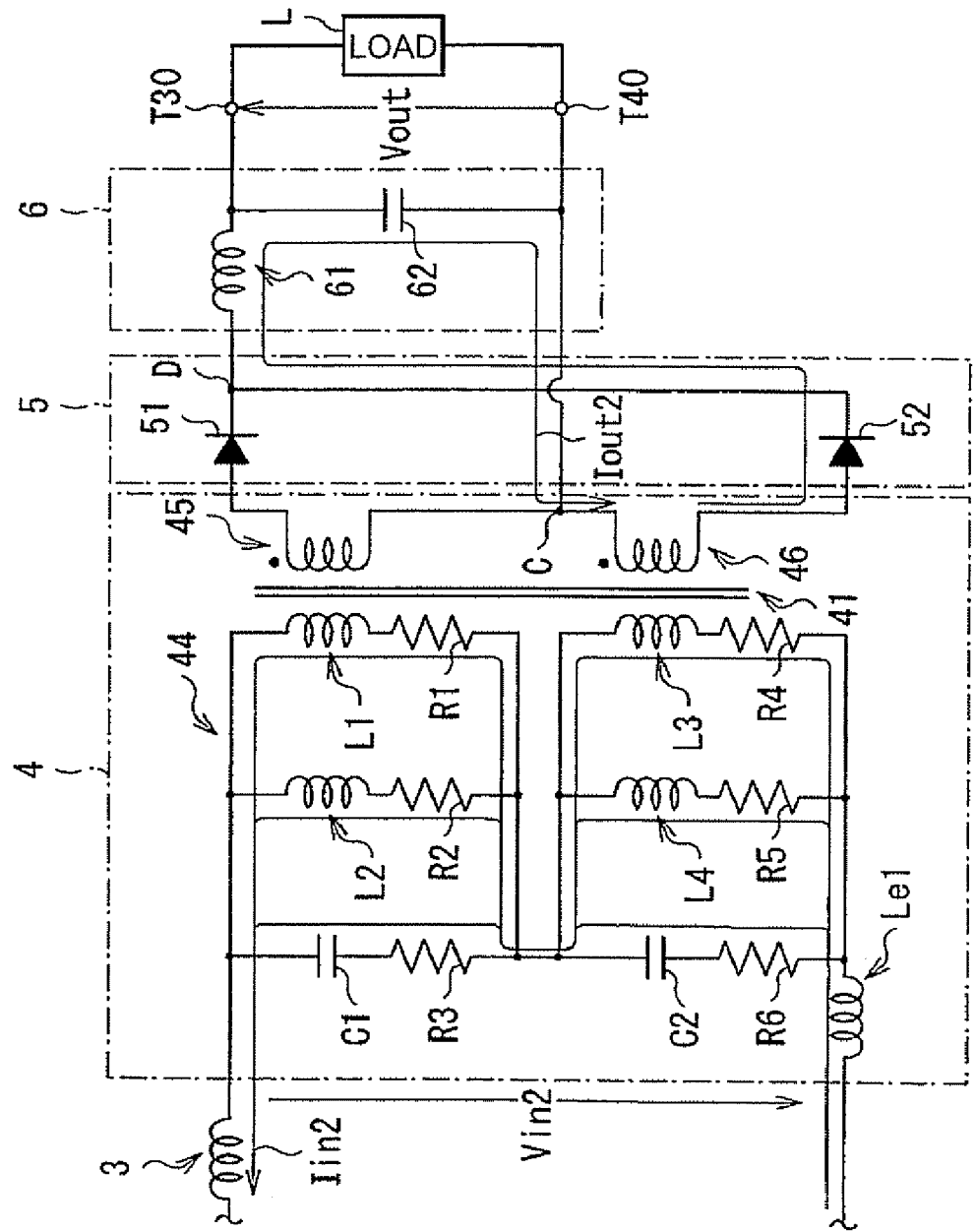
FIG. 18 is another circuit diagram which serves to illustrate the operation of the DC/DC converter.

Furthermore, as shown in FIG. 18, when voltage Vin2 is input to the primary coil 44, current Iin2 flows in the primary coil 42 and primary coil 43 which constitute the primary coil 44. Here, the primary coil 43 is disposed closer to the secondary coil 46 in which the current flows and is therefore relatively tightly magnetically coupled to the secondary coil 46. Here, the primary coil 43 and secondary coil 46 have, based on the principles of a transformer, currents which flow in mutually opposite directions. Therefore, in comparison with a case where coil groups which have the same current flow direction are adjacent, the AC resistance in the primary coil 43 drops because the influence of the proximity effect drops. However, the primary coil 42 is disposed farther from the secondary coil 46 in which the current flows and is therefore relatively loosely magnetically coupled to the secondary coil 46. Here, because the primary coil 42 is disposed closer to the secondary coil 45 in which the current does not flow, the AC resistance in the primary coil 42 is higher as a result of the proximity effect than that of the primary coil 43. However, in this embodiment, because the primary coil 42 and primary coil 43 are connected in series to one another, mutually equal currents flow in the primary coil 42 and primary coil 43.

Thus, in this embodiment, because the primary coil 42 and primary coil 43 are connected in series to one another, a large current also flows in the coil with the larger AC resistance. Hence, ringing which is generated in the output AC voltage (the voltage across the ends A and B in FIG. 9) of the transformer 4 which is produced as a result of the LC resonance caused by of the line capacitances C1 and C2 of the transformer 4, the excitation inductances L2 and L4 of the transformer 4, and the excitation inductance Le1 of the transformer 4 can barely be attenuated by a high AC resistance (See waveform indicated by the bold line in FIG. 16). As a result, the core loss of the transformer 4 and the amount of heat generated by the AC resistance of the transformer 4 drop, whereby efficiency improves.

In addition, in this embodiment, the stacked structure of the respective coils of transformer 4 (primary coil 42A, primary coil 42B, primary coil 43A, primary coil 43B, secondary coil 45A, secondary coil 45B, secondary coil 46A, and secondary coil 46B) has vertical symmetry. Hence, when the secondary coil 45 is driven and the secondary coil 46 is driven, there is substantially no difference in the size of the AC resistance of the transformer 4. As a result, the output AC voltage when the secondary coil 45 is driven and the output AC voltage when the secondary coil 46 is driven are substantially different with regard to the attenuation amount of the ringing. Hence, the amount of heat generated increases periodically and high efficiency can be maintained.

Figure 19:
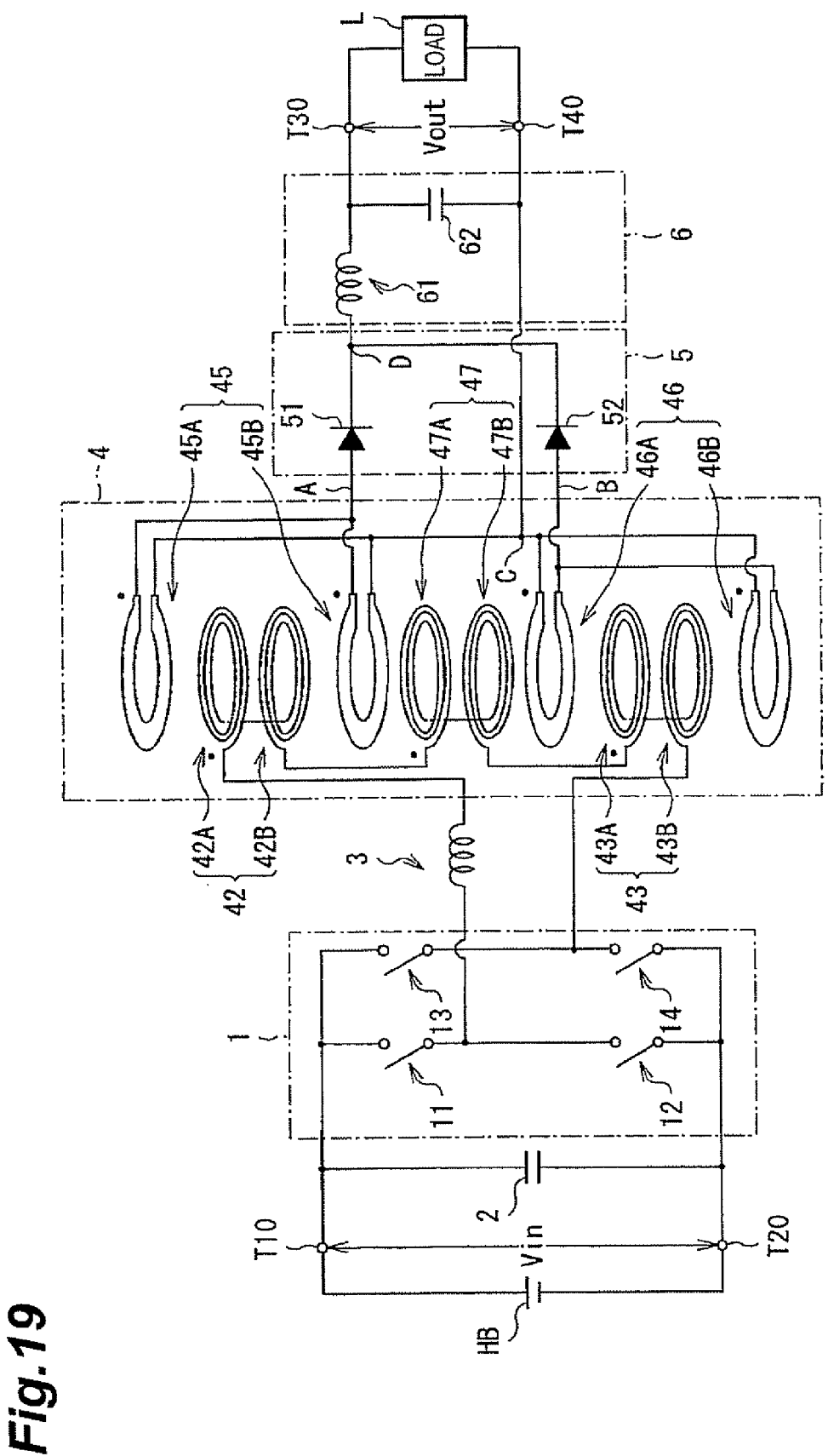
FIG. 19 is a circuit diagram of the DC/DC converter according to one modified example.
Figure 20:
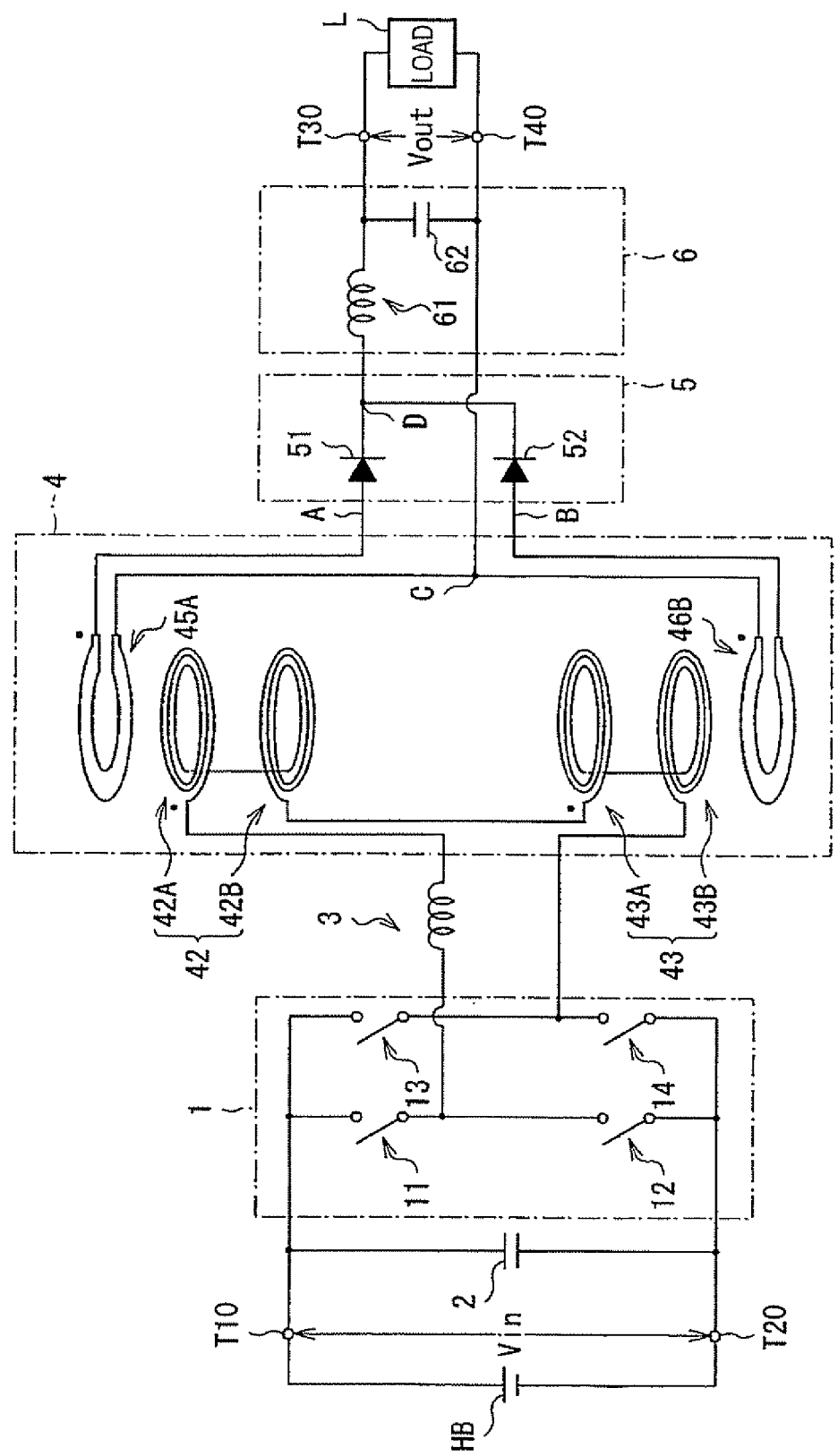
FIG. 20 is a circuit diagram of the DC/DC converter according to another modified example.
Figure 21:
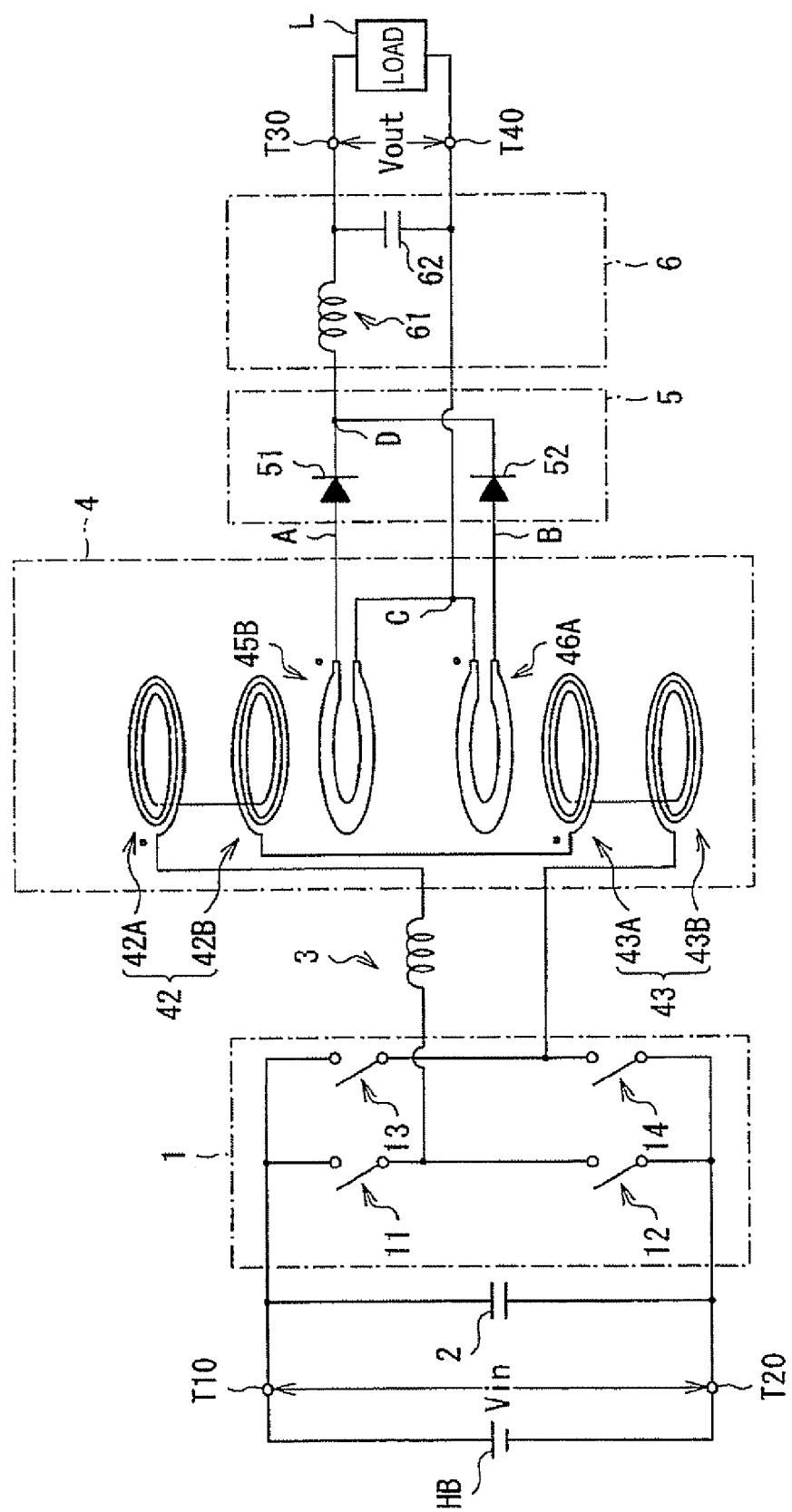
FIG. 21 is a circuit diagram of the DC/DC converter according to another modified example.
Figure 22:
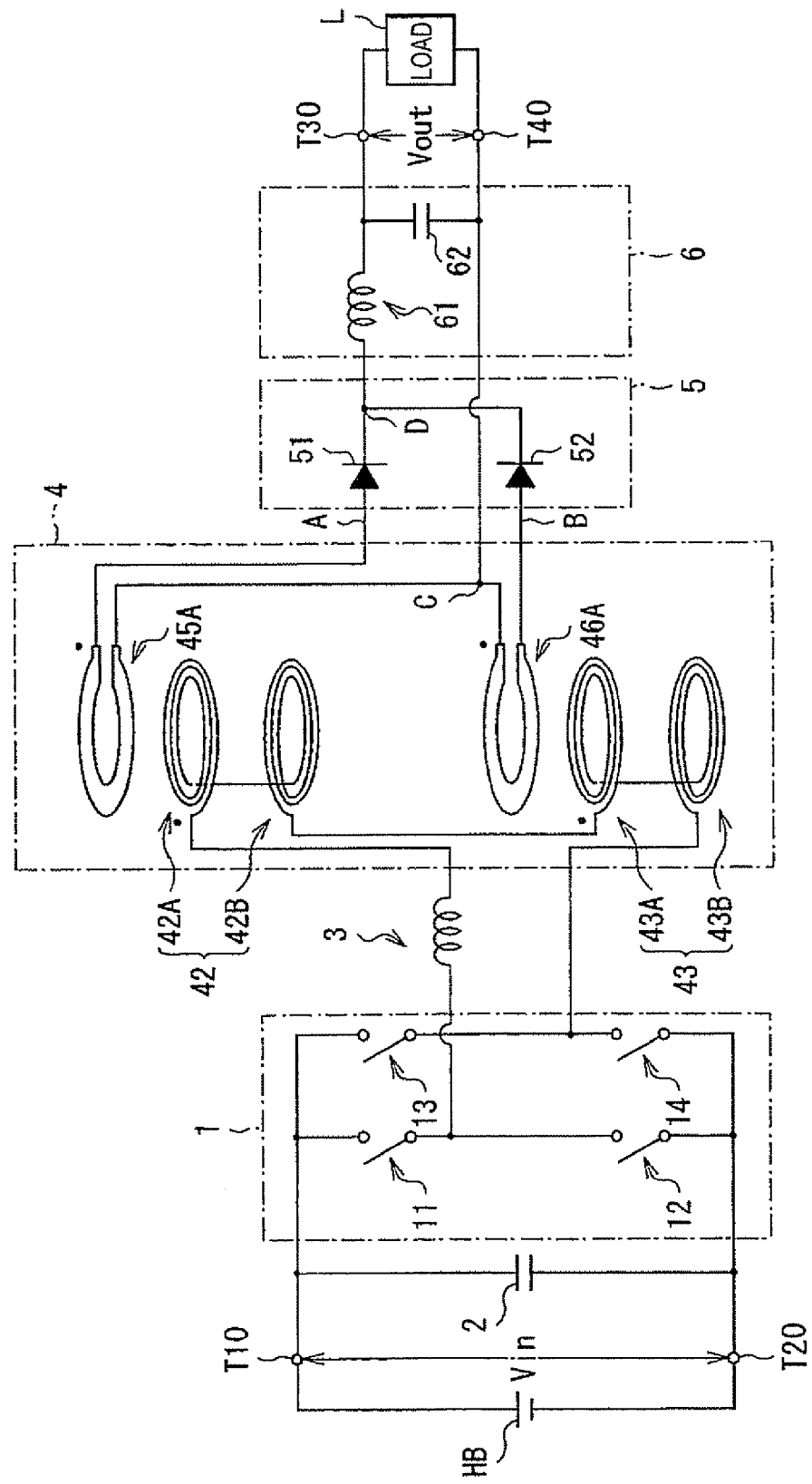
FIG. 22 is a circuit diagram of the DC/DC converter according to another modified example.

In this embodiment, the respective coils of the transformer 4 are disposed stacked in the following order starting from the top: the secondary coil 45A, the primary coil 42A, the primary coil 42B, the secondary coil 45B, the secondary coil 46A, the primary coil 43A, the primary coil 43B, and the secondary coil 46B. However, as shown in FIG. 19, in a state where vertical symmetry is maintained, a primary third coil 47 which is obtained by stacking, in the following order starting from the top, a primary third coil 47A and a primary third coil 47B, may also be disposed inserted between the secondary coil 45B and secondary coil 46A. In addition, in a state where vertical symmetry is maintained, as shown in FIG. 20, the secondary coil 45B and secondary coil 46A may be eliminated and, as shown in FIG. 21, the secondary coil 45A and secondary coil 46B may also be eliminated. Although there is no vertical symmetry, as shown in FIG. 22, the secondary coil 45B and secondary coil 46B may also be eliminated. In either case, a large AC resistance may also be disposed in series in the primary coil 44.

In addition, although the respective coils of the transformer 4 are disposed along the leg portions of the cores in the above embodiment, the respective coils can also be disposed in concentric circuits in a direction that is perpendicular to the leg portions of the cores.

Figure 23:
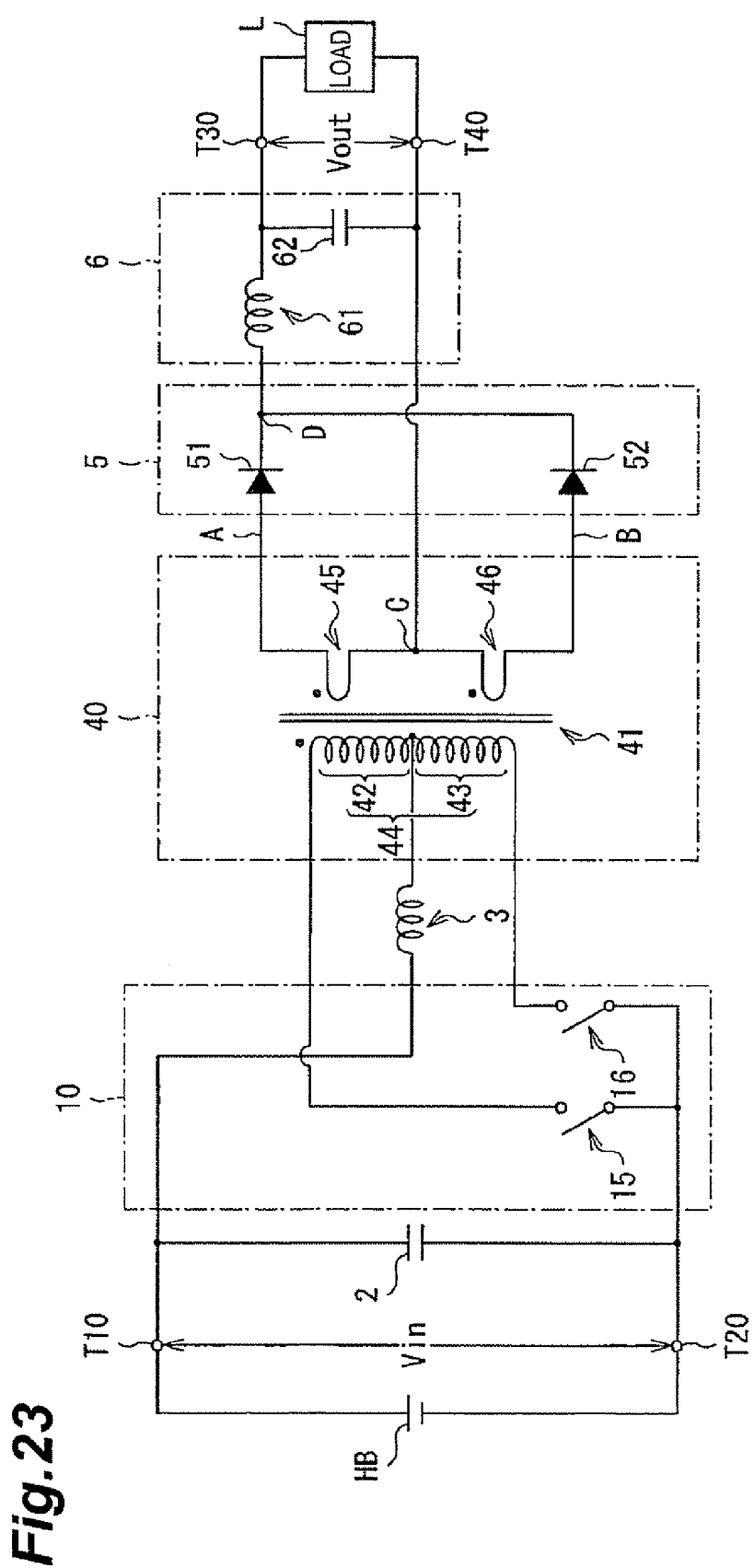
FIG. 23 is a circuit diagram of the DC/DC converter according to the embodiment.
Figure 24:
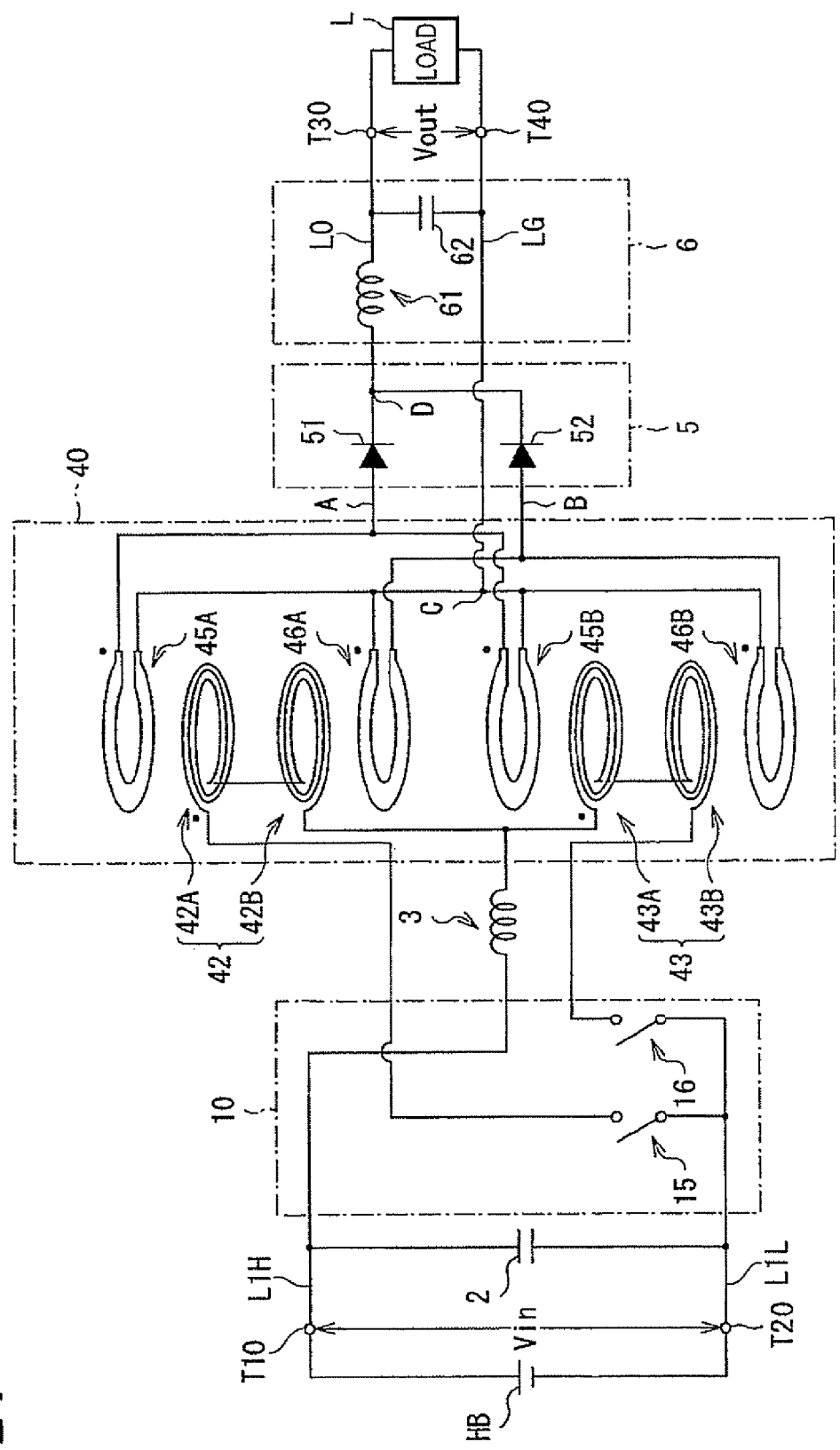
FIG. 24 is a structural diagram of the DC/DC converter.

FIG. 23 shows the circuit constitution of a DC/DC converter according to another embodiment. FIG. 24 shows an enlargement of the structure of the transformer in the DC/DC converter in FIG. 23. In comparison with the above embodiment, the DC/DC converter differs with regard to the constitution of the inverter circuit 10, the connected relationship between the inverter circuit 10 and transformer 40, and the constitution of the transformer 40. Therefore, the differences from the above embodiment will mainly be described and descriptions of the constitution, action, and effects which are also common to the above embodiment will be suitably omitted.

The inverter circuit 10 is a push-pull switching circuit obtained by connecting in parallel two switching elements 15 and 16 which are each driven by switching signals that are supplied by a control circuit (not shown).

The transformer 40 is constituted by stacking respective coils in a different order from the order for transformer 4 of the above embodiment. More specifically, in the stacked structure of the transformer 4 of the above embodiment, the secondary coil 45B and secondary coil 46A are switched and the secondary coil 45A (secondary eleventh coil group), the primary coil 42A (primary eleventh coil group), the primary coil 42B (primary twelfth coil group), the secondary coil 46A (secondary twenty-first coil group), the secondary coil 45B (secondary twelfth coil group), the primary coil 43A (primary twenty-second coil group), the primary coil 43B (primary twenty-first coil group) and the secondary coil 46B (secondary twenty-second coil group) are arranged in that order along the loop of the magnetic circuit. In other words, the stacked structure of the transformer 40 is symmetrical along the loop.

The switching element 15 is provided between one end of the primary coil 42A of the transformer 40 and the primary low-voltage power line L1L. The switching element 16 is provided between one end of the primary coil 43 and the primary high-voltage power line L1H and the resonance inductor 3 is provided between the connection point between the primary coil 42B and primary coil 43A and the primary high-voltage power line L1H.

Figure 25:
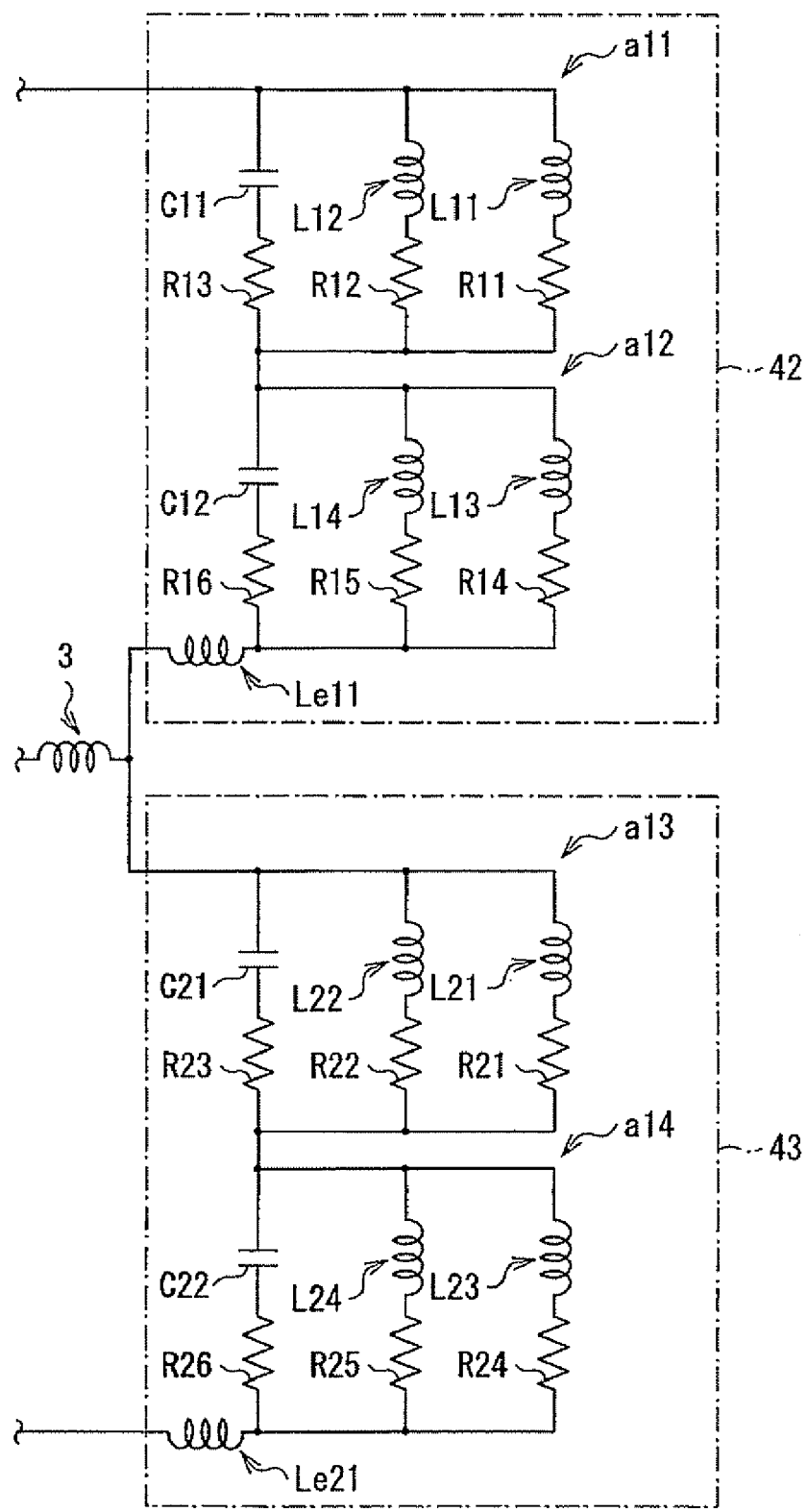
FIG. 25 is an equivalent circuit diagram of the primary coil of the transformer.

Here, the primary coil of the transformer 40, that is, the primary coil 44 which comprises the primary coil 42 and the primary coil 43 can be represented by the equivalent circuit shown in FIG. 25.

The equivalent circuit of the primary coil 42 is a circuit which is obtained by serially connecting a circuit a11, a circuit a12, an inductance Le11 to one another. Circuit a11 is constituted by connecting in parallel an inductance L11 and a resistance R11 which are connected in series to one another, an inductance L12 and a resistance R12 which are connected in series to one another, and a line capacitance C11 and a resistance R13 which are connected in series to one another. Circuit a12 is constituted by connecting in parallel an inductance L13 and a resistance R14 which are connected in series to one another, an inductance L14 and a resistance R15 which are connected in series to one another, and a line capacitance C12 and a resistance R16 which are connected in series to one another.

The equivalent circuit of the primary coil 43 is a circuit which is obtained by serially connecting a circuit a13, a circuit a14, and an inductance Le21. Circuit a13 is constituted by connecting in parallel an inductance L21 and a resistance R21 which are connected in series to one another, an inductance L22 and a resistance 122 which are connected in series to one another, and a line capacitance C21 and a resistance R23 which are connected in series to one another. Circuit a14 is constituted by connecting in parallel an inductance L23 and a resistance R24 which are connected in series to one another, an inductance L24 and a resistance R25 which are connected in series to one another, and a line capacitance C22 and a resistance R26 which are connected in series to one another.

In the equivalent circuit of the primary coil 42, the inductance L11 is an inductance of the primary coil 42A when the transformer 40 is an ideal transformer and the resistance R11 is the resistance of the primary coil 42A when the transformer 40 is an ideal transformer. The inductance L12 is an excitation inductance of the primary coil 42A and the resistance R12 is the AC resistance component of the primary coil 42A. The line capacitance C11 is the total capacitance of the line capacitance in the primary coil 42A and the line capacitances of the primary coil 42A and the secondary coils 45 and 46 and the resistance R13 is the AC resistance component of the primary coil 42A.

The inductance L13 is the inductance of the primary coil 42B when the transformer 40 is an ideal transformer and the resistance R14 is the resistance of the primary coil 42B when the transformer 40 is an ideal transformer. The inductance L14 is the excitation inductance of the primary coil 42B and the resistance R15 is the AC resistance component of primary coil 42B. The line capacitance C12 is the total capacitance of the line capacitance in the primary coil 42B and the line capacitances of the primary coil 42B and the secondary coils 45 and 46 and the resistance R16 is the AC resistance component of the primary coil 42B. The inductance Le11 is the excitation inductance of the transformer which is constituted by the primary coil 42 and secondary coils 45 and 46.

In the equivalent circuit of the primary coil 43, the inductance L21 is the inductance of the primary coil 43A when the transformer 40 is an ideal transformer and the resistance R21 is the resistance of the primary coil 43A when the transformer 40 is an ideal transformer. The inductance L22 is the excitation inductance of the primary coil 43A and the resistance R22 is the AC resistance component of the primary coil 43A. The line capacitance C21 is the total capacitance of the line capacitance in the primary coil 43A and the line capacitances of the primary coil 43A and the secondary coils 45 and 46 and the resistance R23 is the AC resistance component of the primary coil 43A.

The inductance L23 is the inductance of the primary coil 43B when the transformer 40 is an ideal transformer and the resistance R24 is the resistance of the primary coil 43B when the transformer 40 is an ideal transformer. The inductance L24 is the excitation inductance of the primary coil 43B and the resistance R25 is the AC resistance component of the primary coil 43B. The line capacitance C22 is the total capacitance of the line capacitance in the primary coil 43B and the line capacitances of the primary coil 43B and the secondary coils 45 and 46 and the resistance R26 is the AC resistance component of the primary coil 43B. The inductance Le21 is the leakage inductance of a transformer which is constituted by the primary coil 43 and secondary coils 45 and 46.

The action of the DC/DC converter of the above constitution will be described next.

When the switching element 15 of the inverter circuit 10 is turned ON, the current Iin1 flows from the resonance inductor 3 in the direction of the primary coil 42B, primary coil 42A, and switching element 15, the voltage Vin1 appears in the primary coil 42, and the current Iin1 flows in the primary coil 42A and the primary coil 42B which constitute the primary coil 42. Meanwhile, a voltage which has a reverse bias with respect to diode 52 and a forward bias with respect to the diode 51 appears in the secondary coils 45 and 46 of the transformer 40. Hence, a current Iout1 flows to the output line LO and ground line LG via the secondary coil 45, diode 51, choke coil 61, and smoothing capacitor 62. Here, a voltage Vout which has been smoothed by the smoothing circuit 6 is output to the output terminals T30 and T40 which are connected in parallel to the smoothing capacitor 62.

Thereafter, when the switching element 15 is turned from ON to OFF, a voltage which has a forward bias with respect to diode 52 appears in the secondary coils 45 and 46 of the transformer 40. Hence, current flows to the output line LO and ground line LG via the secondary coil 46, diode 52, choke coil 61, and smoothing capacitor 62. Thereupon, a voltage Vout which has been smoothed by the smoothing circuit 6 is output to the output terminals T30 and T40 which are connected in parallel to the smoothing capacitor 62.

Thereafter, when the switching element 16 is turned ON, current flows from the resonance inductor 3 in the direction of the primary coil 43A, primary coil 43B, and switching element 16, a voltage Vin2 appears in the primary coil 43, and a current Iin2 flows in the primary coils 43A and 4313 which constitute primary coil 43. However, a voltage which has a forward bias with respect to diode 52 and a reverse bias with respect to diode 51 appears in the secondary coils 45 and 46 of transformer 40. Hence, a current Iout2 flows to the output line LO and ground line LG via the secondary coil 46, diode 52, choke coil 61, and smoothing capacitor 62. Thereupon, the voltage Vout which has been smoothed by the smoothing circuit 6 is output to the output terminals T30 and T40 which are connected in parallel to the smoothing capacitor 62.

Ultimately, when the switching element 16 is turned from ON to OFF, a voltage which has a forward bias with respect to diode 51 appears in the secondary coils 45 and 46 of transformer 40. Hence, current flows to output line LO and ground line LG via the secondary coil 45, diode 51, choke coil 61, and smoothing capacitor 62. Thereupon, the voltage Vout which is smoothed by the smoothing circuit 6 is output to the output terminals T30 and T40 which are connected in parallel to the smoothing capacitor 62.

Thus, the DC/DC converter converts (steps down) the DC input voltage Vin which was supplied by the power source into the DC output voltage Vout and supplies the DC output voltage Vout thus converted to the load.

The effects of the DC/DC converter of this embodiment will be described next.

Figure 26:
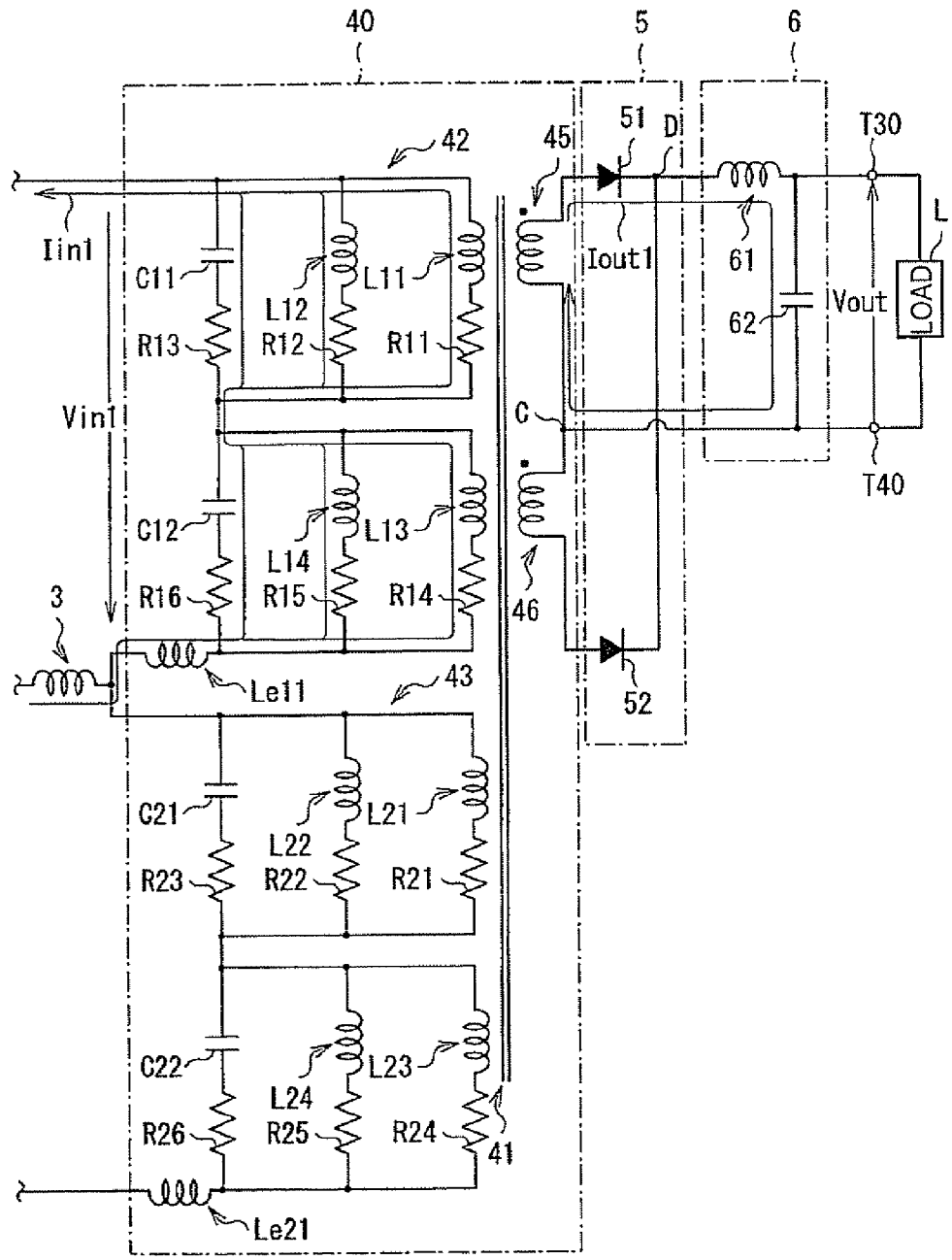
FIG. 26 is a circuit diagram which serves to illustrate the operation of the DC/DC converter.

In this embodiment, as shown in FIG. 26, when voltage Vin1 is input to the primary coil 42, a current Iin1 flows in the primary coil 42A and primary coil 42B which constitute primary coil 42. Here, the primary coil 42A is disposed closer to the secondary coil 45 in which the current flows and is therefore tightly magnetically coupled to the secondary coil 45. Here, the primary coil 42A and secondary coil 45 have, based on the principles of the transformer, currents which flow in mutually opposite directions. Therefore, in comparison with a case where coil groups which have the same current flow direction are adjacent, the AC resistance in the primary coil 42A drops because the influence of the proximity effect drops.

However, the primary coil 42B is disposed farther from the secondary coil 45 in which the current flows and is therefore relatively loosely magnetically coupled to the secondary coil 45. Here, because the primary coil 43 is disposed closer to the secondary coil 46 in which the current does not flow, the AC resistance in the primary coil 42B is higher as a result of the proximity effect than that of the primary coil 42A. However, in this embodiment, because the primary coil 42A and primary coil 42B are connected in series to one another, mutually equal currents flow in the primary coil 42A and primary coil 42B.

Figure 27:
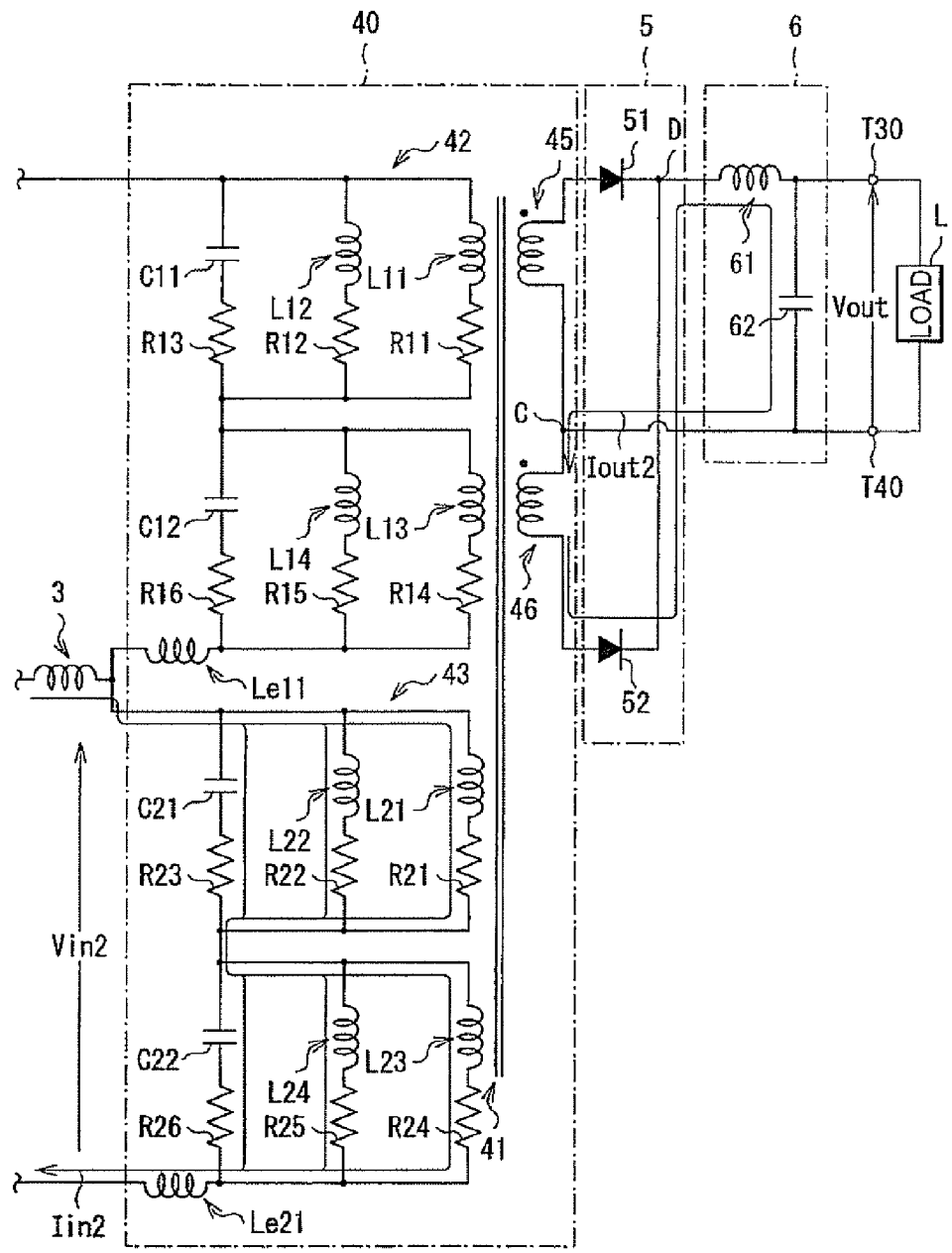
FIG. 27 is another circuit diagram which serves to illustrate the operation of the DC/DC converter.

Furthermore, as shown in FIG. 27, when voltage Vin2 is input to the primary coil 43, current Iin2 flows in the primary coil 43A and primary coil 43B which constitute the primary coil 43. Here, the primary coil 43B is disposed closer to the secondary coil 46 in which the current flows and is therefore relatively tightly magnetically coupled to the secondary coil 46. Here, the primary coil 43B and secondary coil 46 have, based on the principles of a transformer, currents which flow in mutually opposite directions. Therefore, in comparison with a case where coil groups which have the same current flow direction are adjacent, the AC resistance in the primary coil 4313 drops because the influence of the proximity effect drops.

However, the primary coil 43A is further from the secondary coil 46 in which the current flows and is therefore relatively loosely magnetically coupled to the secondary coil 46. Here, because the primary coil 43A is closer to the secondary coil 45 in which current does not flow, the AC resistance in the primary coil 43A is higher as a result of the proximity effect than that of the primary coil 43B. However, in this embodiment, because the primary coil 43A and primary coil 43B are connected in series to one another, mutually equal currents flow in the primary coil 43A and primary coil 43B.

Thus, in this embodiment, the primary coil 42A and primary coil 42B and the primary coil 43A and primary coil 43B respectively are connected in series to one another and a large current therefore also flows in a coil with a large AC resistance. Hence, ringing which is generated in the output AC voltage (the voltage across the ends A and B in FIGS. 23 and 24) of the transformer 40 which is produced as a result of the LC resonance caused by the line capacitance C21, the excitation inductance L22, and the excitation inductance Le11 as well as the LC resonance caused by the line capacitance C22, excitation inductance L24, and excitation inductance Le21 can barely be attenuated by a high AC resistance as per the above embodiment. As a result, the core loss of the transformer 40 and the amount of heat generated by the AC resistance of the transformer 40 drop and the efficiency improves.

In addition, in this embodiment, the stacked structure of the respective coils of transformer 40 (primary coil 42A, primary coil 42B, primary coil 43A, primary coil 43B, secondary coil 45A, secondary coil 45B, secondary coil 46A, and secondary coil 46B) has vertical symmetry. Hence, when the secondary coil 45 is driven and the secondary coil 46 is driven, there is substantially no difference in the size of the AC resistance of the transformer 40. As a result, the output AC voltage when the secondary coil 45 is driven and the output AC voltage when the secondary coil 46 is driven are substantially different with regard to the attenuation amount of the ringing. Hence, the amount of heat generated increases periodically and high efficiency can be maintained.

Figure 28:
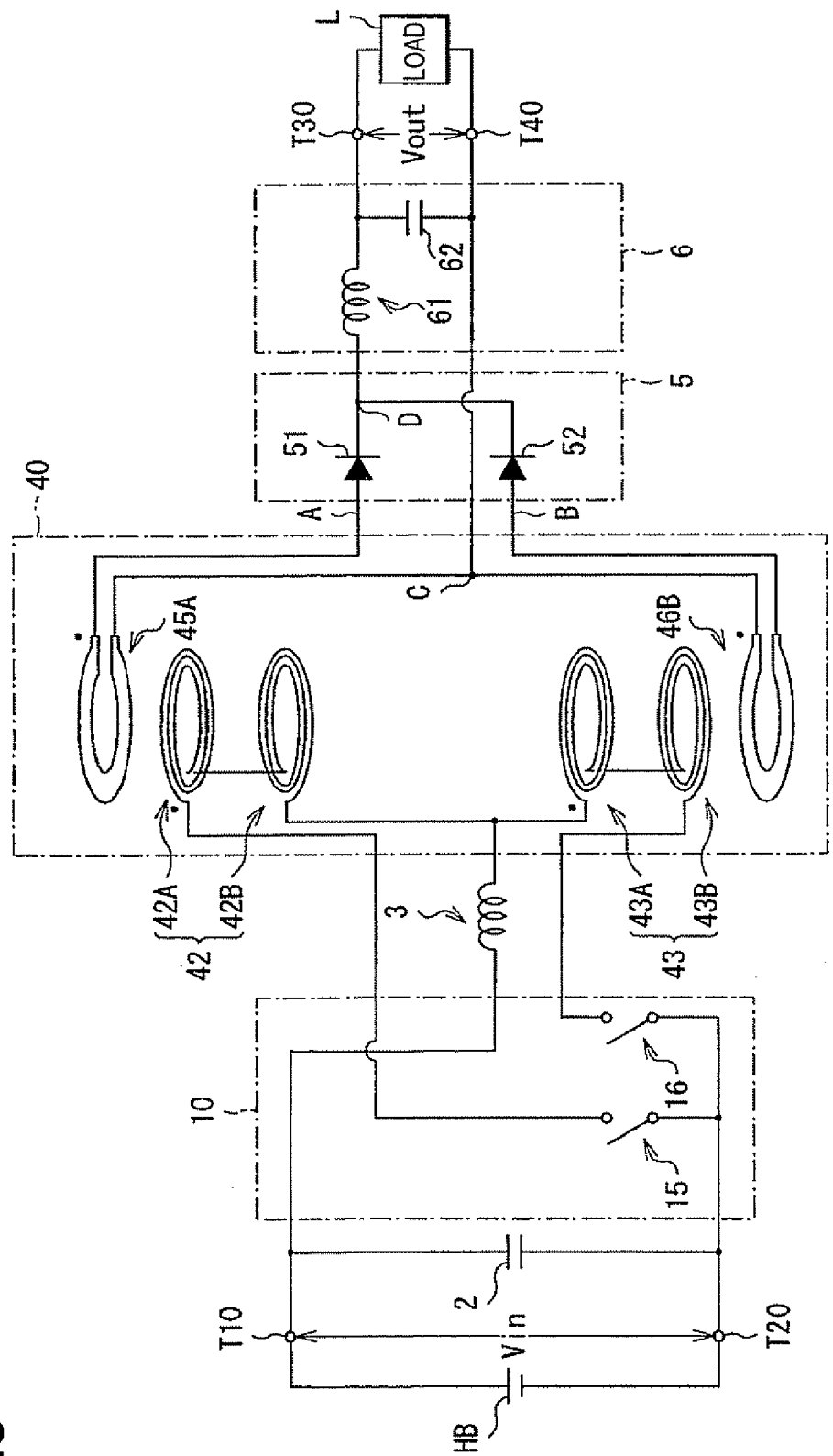
FIG. 28 is a circuit diagram of the DC/DC converter according to a modified example.
Figure 29:
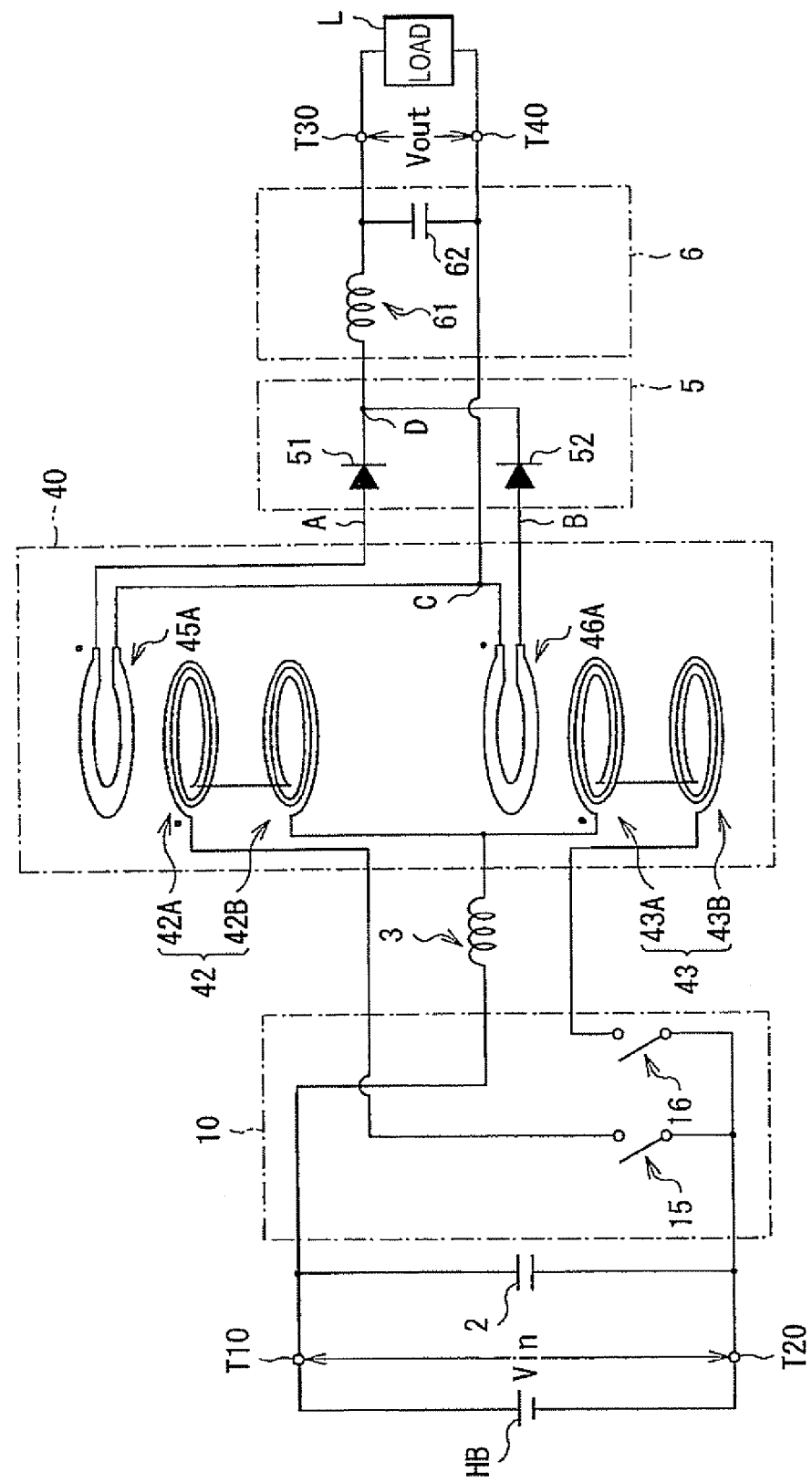
FIG. 29 is a circuit diagram of the DC/DC converter according to another modified example.

In this embodiment, the respective coils of the transformer 40 are disposed stacked in the following order: the secondary coil 45A, the primary coil 42A, the primary coil 42B, the secondary coil 46A, the secondary coil 45B, the primary coil 43A, the primary coil 43B, and the secondary coil 46B. However, as shown in FIG. 28, in a state where vertical symmetry is maintained, the secondary coil 45B and secondary coil 46A may also be eliminated. Although there is no vertical symmetry, as shown in FIG. 29, the secondary coil 45B and secondary coil 46B may also be eliminated. In either case, a large AC resistance may also be disposed in series in the primary coil 44.

In addition, although the respective coils of the transformer 40 are disposed along the leg portions of the cores in the above embodiment, the respective coils can also be disposed in concentric circuits in a direction that is perpendicular to the leg portions of the cores.

Although the present invention was described by way of the embodiments hereinabove, the present invention is not limited to these embodiments and a variety of modifications can be made.

For example, in the above embodiment, although the secondary equivalent circuit of the transformers 4 and 40 is constituted with a common cathode connection, a common anode connection is also possible.

Figure 30:
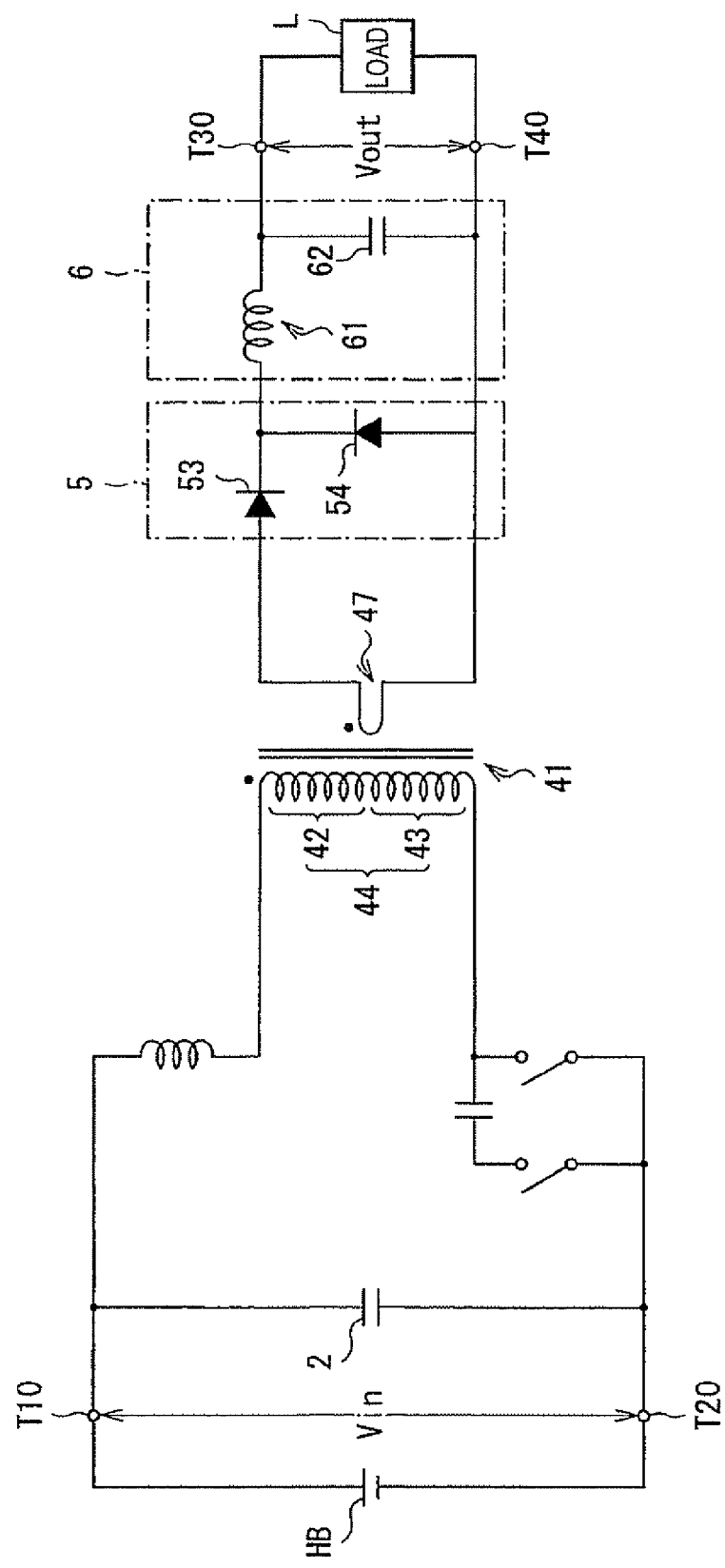
FIG. 30 is a circuit diagram of the DC/DC converter according to another modified example.
Figure 31:
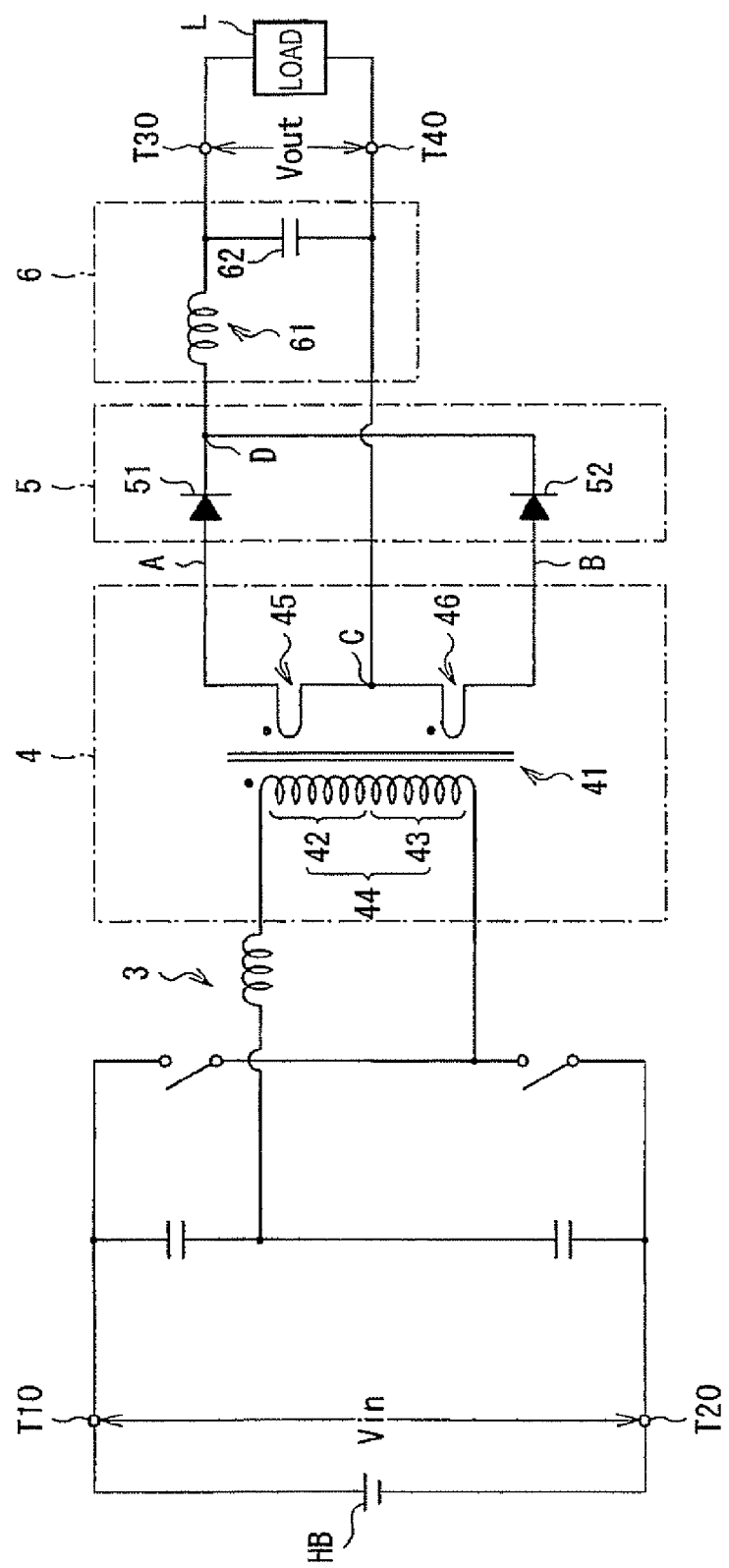
FIG. 31 is a circuit diagram of the DC/DC converter according to another modified example.

In addition, in the above embodiments, the inverter circuits 1 and 10 are full-bridge-type inverter circuits or push-pull-type inverter circuits. However, forward-type inverter circuits such as the inverter circuit illustrated in FIG. 30 and halfbridge-type inverter circuits such as the inverter circuit illustrated in FIG. 31 are also possible.

In the above embodiment, the positions of the secondary coils and primary coils arranged along the loop of the magnetic circuit are adjacent to one another and may also be switched. This switching can also be applied to all of the embodiments but the optimum form of switching connection is illustrated.

Figure 32:
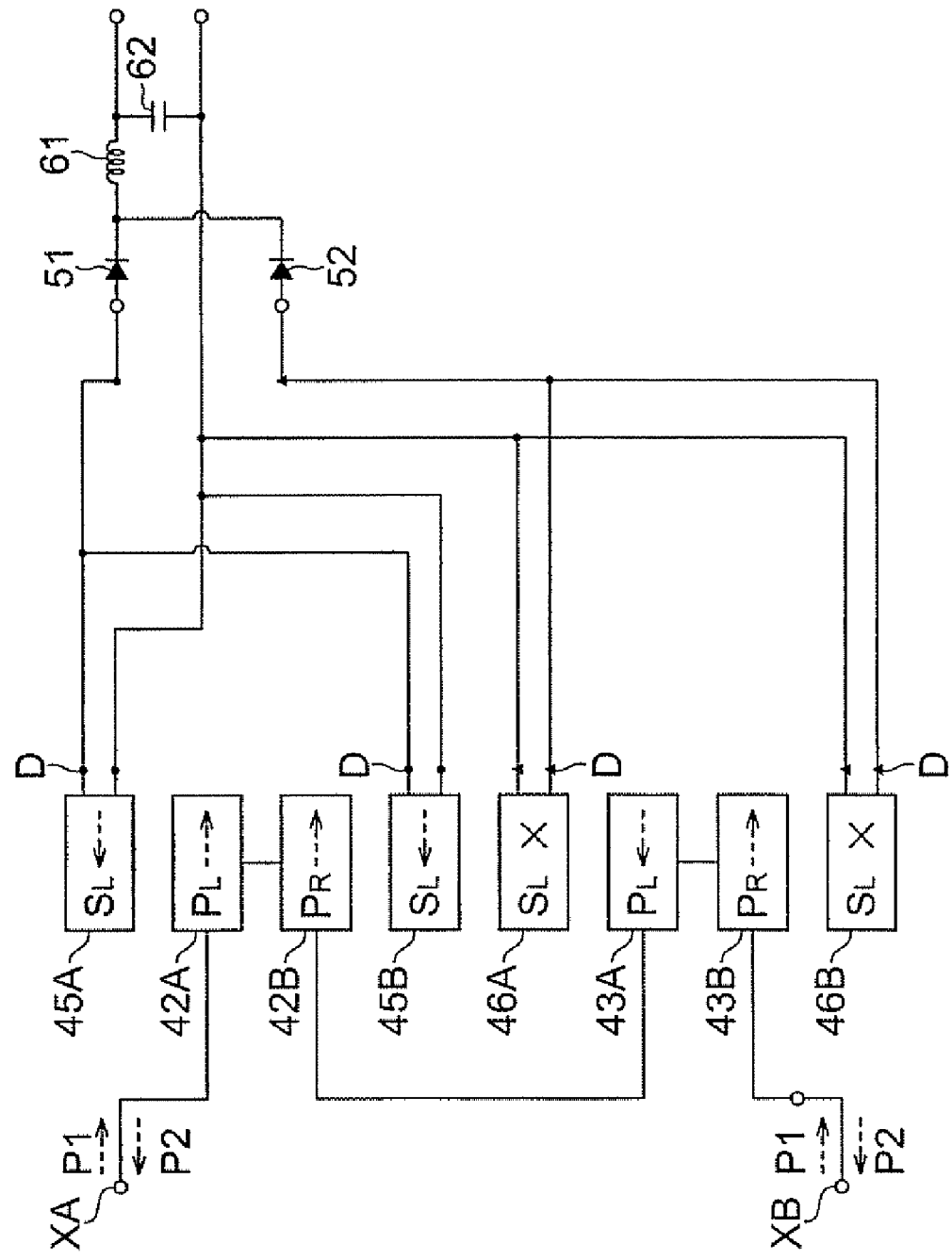
FIG. 32 shows the arrangement of the transformer 4 of the DC/DC converter.

FIG. 32 shows an arrangement of transformer 4 of the DC/DC converter shown in FIG. 10. In the blocks in FIG. 32, the primary coils are represented by 'P', the secondary coils are denoted 'S', the right windings are denoted by the subscript 'R', and the left windings are denoted by the subscript 'L'. The secondary coils are single windings but are treated as left windings for the sake of convenience. The direction of winding from the outside to the inside of the coil as viewed from above FIG. 10 is the winding direction. The terminals which are directly connected to the anodes of the diodes 51 and 52 of the two terminals of the secondary coils are denoted 'D'. Further, in cases where current flows in the coil in FIG. 10, the direction in which the current flows in the coil as seen from the front of FIG. 10 is indicated by a dotted line arrow. The wiring which is connected to the innermost terminal of the coil is indicated by a segment that extends vertically from the center of each block and the wiring connected to the outside terminal is indicated by a segment that extends from the side of the blocks.

In the transformer 4 in FIG. 10, a secondary coil $S_L$, a primary coil $P_L$, a primary coil $P_R$, a secondary coil $S_L$, a secondary coil $S_L$, a primary coil $P_L$, a primary coil $P_R$, and a secondary coil $S_L$ are disposed in that order starting from the top along the path of the magnetic flux. The second and third primary coils $P_L$ and $P_R$ respectively can also be regarded as a single coil. Furthermore, the sixth and seventh primary coils $P_L$ and $P_R$ respectively can also be regarded as a single coil. The operation is as described earlier but will be described in simple terms.

A current which flows in the opposite direction from the current flowing in the primary coil is to enter the secondary coil. However, in cases where the current which is to enter is supplied from the anodes of the diodes 51 and 52, the diode prevents the current supply and the current is therefore not supplied. Conversely, in cases where the current which is to enter the secondary coil is supplied by the cathode of diodes 51 and 52, current flows in the secondary coil. In FIG. 10, the current which flows in the case of current path P1 is indicated by an arrow and a case where current does not flow is indicated by the symbol x. In the case of current path P2, the operation is the reverse of that of the case of current path P1.

Figure 33:
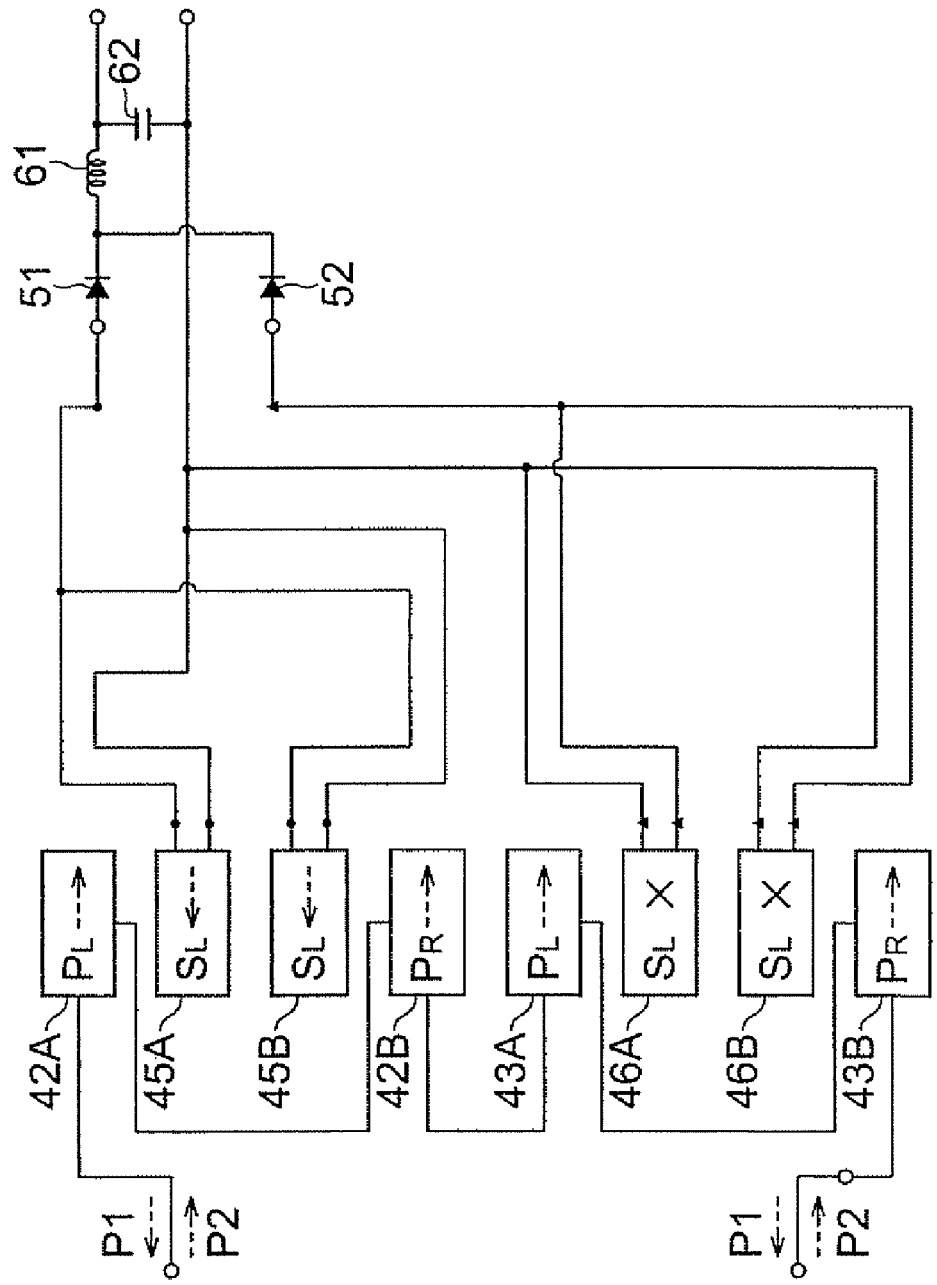
FIG. 33 shows the arrangement of the transformer 4 of the DC/DC converter.

FIG. 33 shows the arrangement of the transformer in a case where the placement of adjacent primary and secondary coils is switched.

In the transformer 4 of FIG. 33, a primary coil $P_L$, a secondary coil $S_L$, a secondary coil $S_L$, a primary coil $P_R$, a primary coil $P_L$, a secondary coil $S_L$, a secondary coil $S_L$, and a primary coil $P_R$ are disposed in that order starting from the top along the path of the magnetic flux. The connections are the same as those detailed above. Because the state of the magnetic coupling between adjacent coils does not change as a result of this position switching, the operation is the same as that described earlier.

Note that the above switching supply may output an AC signal by controlling the switching pulse signal applied to the inverter.

What is claimed is:

1. A switching supply comprising:
an inverter circuit which is connected to a primary coil group of a transformer; and
a rectification/smoothing circuit which is connected to a secondary coil group of the transformer, wherein
the transformer comprises a core having a first through section and a second through section, which is spatially separate from the first through section and constitutes a magnetic circuit together with the first through section,
the first through section passes through the inside of at least one coil of the primary coil group and at least one coil of the secondary coil group,
the second through section passes through the inside of the remaining coils of the primary and secondary coil groups,
following one loop direction of the magnetic circuit, a first coil group has a primary coil and a secondary coil that are magnetically coupled and, subsequently to the first coil group, a second coil group has a primary coil and a secondary coil that are magnetically coupled,
the secondary coil group includes secondary coils, the secondary coils of the secondary coil group being constituted by first and second platelike members,
the first platelike member of the secondary coils has first and second openings and first and second slits,
the first through section is arranged in the first opening,
the second through section is arranged in the second opening,
the first slit is continued to the first opening,
the second slit is continued to the second opening;
the first and second slits extend from the first and second openings in mutually opposite directions,
the second platelike member of the secondary coils has third and fourth openings and third and fourth slits,
the first through section is arranged in the third opening,
the second through section is arranged in the fourth opening,
the third slit is continued to the third opening,
the fourth slit is continued to the fourth opening,
the third and fourth slits extend from the third and fourth openings in mutually opposite directions, and
the first and third slits extend from the first and third openings in mutually opposite directions.

2. The switching supply according to claim 1, wherein the coils of the first or second coil group are arranged in one loop direction of the magnetic circuit in the following order: secondary coil, primary coil and secondary coil, or primary coil, secondary coil and primary coil.

3. The switching supply according to claim 1, wherein
the primary coil of the first coil group and the primary coil of the second coil group are connected in series, and
the AC resistance of the primary coil of the first coil group and the AC resistance of the primary coil of the second coil group are set such that one is alternately higher than the other in sync with the switching of the inverter circuit.

4. The switching supply according to claim 1, wherein said switching supply is a DC/DC converter.

5. The switching supply according to claim 1, wherein
the mutually opposite directions of the first and second slits allow a current to flow in a rotary direction in the first platelike member of the secondary coils, and
the mutually opposite directions of the third and fourth slits allow a current to flow in a rotary direction in the second platelike member of the secondary coils.

* * * * *